United States Patent
Wong et al.

(10) Patent No.: US 12,141,100 B2
(45) Date of Patent: Nov. 12, 2024

(54) REPOSITORY FOR QUICK RETRIEVAL OF OBJECT(S) OF A COMMUNICATION PLATFORM

(71) Applicant: Salesforce, Inc., San Francisco, CA (US)

(72) Inventors: Jason Hon-Son Wong, Burnaby (CA); Julie Punturo, Dublin (IE); Elizabeth Anne Millikin, Denver, CO (US); Zachery Floyd, Arvada, CO (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/226,824

(22) Filed: Apr. 9, 2021

(65) Prior Publication Data

US 2022/0327097 A1    Oct. 13, 2022

(51) Int. Cl.
| | |
|---|---|
| *G06F 16/16* | (2019.01) |
| *G06F 3/04817* | (2022.01) |
| *G06F 16/55* | (2019.01) |
| *H04L 51/216* | (2022.01) |

(52) U.S. Cl.
CPC ........ *G06F 16/168* (2019.01); *G06F 3/04817* (2013.01); *G06F 16/55* (2019.01); *H04L 51/216* (2022.05)

(58) Field of Classification Search
CPC .... G06F 16/168; G06F 16/55; G06F 3/04817; G06F 16/176; H04L 51/16; H04L 51/216; H04L 51/42
See application file for complete search history.

(56) References Cited

U.S. PATENT DOCUMENTS

| | | | | |
|---|---|---|---|---|
| 2005/0108338 A1* | 5/2005 | Simske | ................... | G10L 15/26 704/E15.045 |
| 2005/0198153 A1* | 9/2005 | Keohane | ............ | G06F 3/04817 709/206 |
| 2012/0158853 A1* | 6/2012 | Baartman | ........... | H04L 12/1827 709/206 |
| 2012/0173533 A1* | 7/2012 | Ramarao | ................ | G06Q 10/00 707/740 |

(Continued)

OTHER PUBLICATIONS

U.S. Appl. No. 16/993,859, filed Aug. 14, 2020, Butterfield, et al., "Electronic Board Associated With a Communication Platform", 45 pages.

(Continued)

*Primary Examiner* — Daniel W Parcher
(74) *Attorney, Agent, or Firm* — Lee & Hayes, P.C.

(57) ABSTRACT

A repository for quick retrieval of object(s) of a communication platform is described. Server(s) of the communication platform can receive, in association with a user interface, a request to associate an object with a repository. The server(s) can store an object identifier of the object in the repository and cause display of an object user interface element representative of the object to be presented in association with a repository user interface element representative of the repository. In response to receiving a selection of the object user interface element, the server(s) can retrieve the object using the object identifier and cause the object to be presented, in the user interface with contextual data, wherein the contextual data comprises other object(s) associated with the object.

16 Claims, 22 Drawing Sheets

(56) References Cited

U.S. PATENT DOCUMENTS

| | | | |
|---|---|---|---|
| 2014/0114973 A1* | 4/2014 | Wetherell | G06F 3/04817 |
| | | | 707/737 |
| 2015/0215246 A1* | 7/2015 | Lung | H04L 51/22 |
| | | | 715/752 |
| 2016/0283567 A1* | 9/2016 | Beausoleil | H04L 51/22 |
| 2016/0335622 A1* | 11/2016 | Park | G06Q 20/322 |
| 2017/0093774 A1* | 3/2017 | Arastafar | H04L 65/1069 |
| 2018/0097757 A1* | 4/2018 | Nguyen | H04L 51/08 |
| 2018/0123814 A1* | 5/2018 | Sexauer | H04L 51/04 |
| 2018/0287982 A1 | 10/2018 | Draeger et al. | |
| 2021/0209292 A1* | 7/2021 | Varma | G06F 40/169 |

OTHER PUBLICATIONS

U.S. Appl. No. 17/111,408, filed Dec. 3, 2020, Khosrowshahi, "Integrating a Third-Party Platform Into a Communication Platform", 53 pages.

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

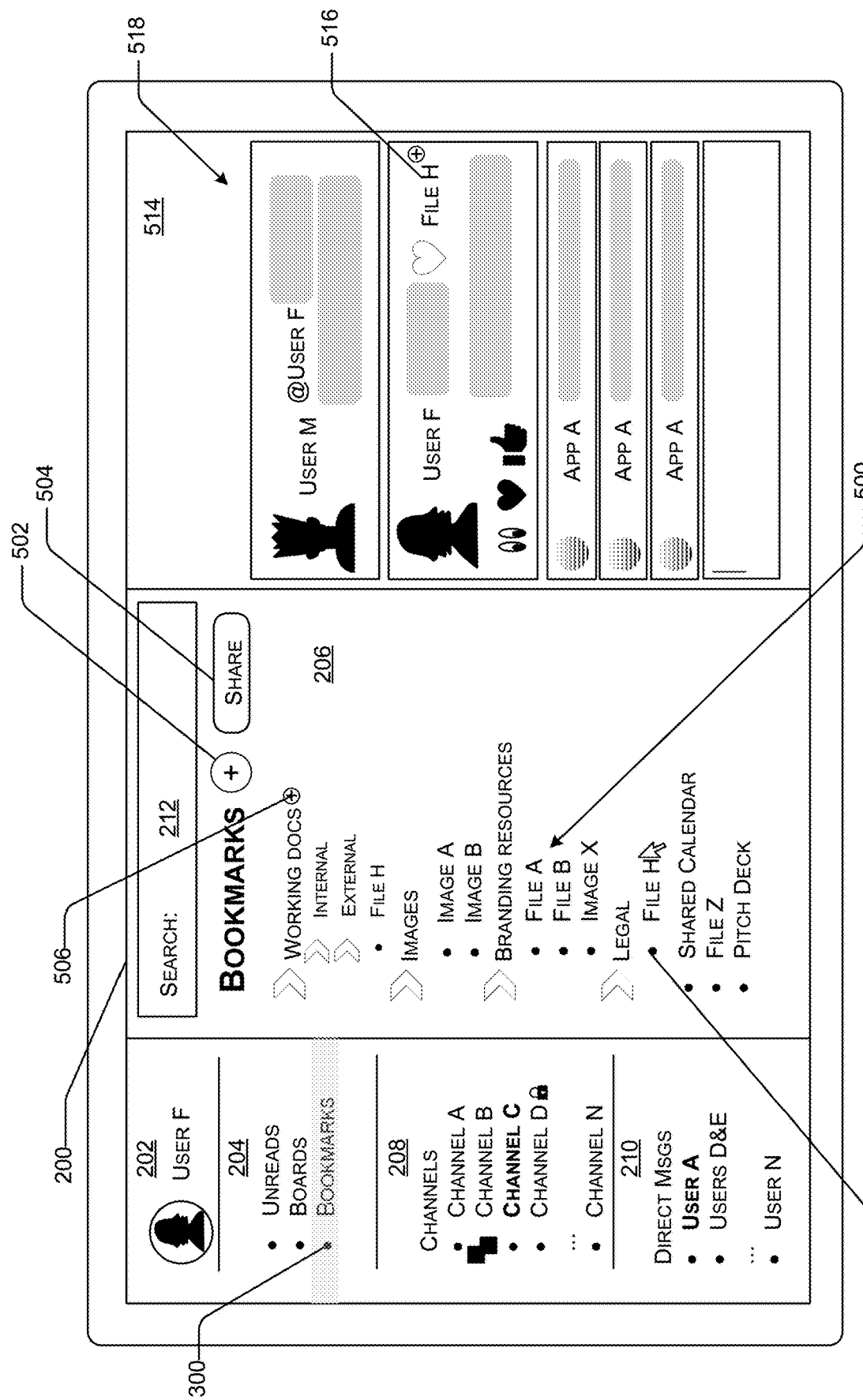

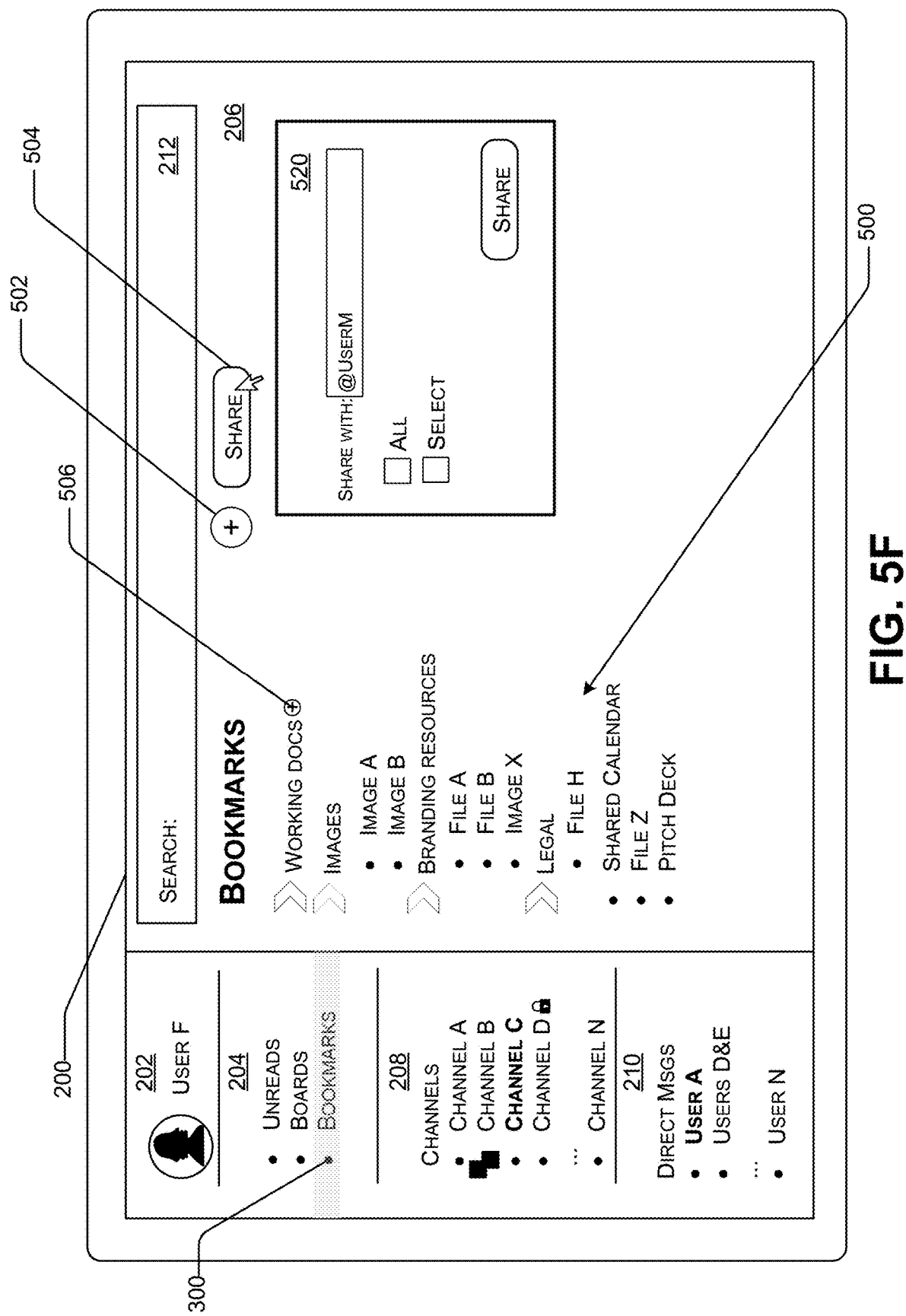

REPOSITORY FOR QUICK RETRIEVAL OF OBJECT(S) OF A COMMUNICATION PLATFORM

TECHNICAL FIELD

A communication platform can leverage a network-based computing system to enable users to exchange data for communication and/or collaboration. In some examples, users can exchange messages via the communication platform. In some examples, applications associated with third-party platforms (e.g., third-party applications) can be integrated into the communication platform and can be used by users for communicating via the communication platform, performing actions in association with the communication platform, and/or otherwise providing data to the communication platform. As such, users and/or applications can generate data that can be presented via a user interface of the communication platform.

In some examples, the user interface can present a data feed indicating messages posted to and/or actions taken with respect to a particular channel, direct message, or the like. In existing techniques, the user interface can be cluttered and overwhelming to users. In existing techniques, the user interface can require users to scroll and/or otherwise navigate through data—from users, applications, and/or the like—to understand context of the communication and effectively utilize the communication platform. Further, this scrolling and/or other navigation can cause poor user experiences and can be inefficient.

BRIEF DESCRIPTION OF THE DRAWINGS

The detailed description is described with reference to the accompanying figures. In the figures, the leftmost digit of a reference number identifies the figure in which the reference number first appears. The use of the same reference numbers in different figures indicates similar or identical components or features. The figures are not drawn to scale.

FIG. 5D illustrates another example of the user interface of FIG. 2A, as described herein, wherein an object accessible via an object user interface element of FIG. 5B is presented, with context, therein.

FIG. 5F illustrates another example of the user interface of FIG. 2A, as described herein, wherein an actuation mechanism associated with a sharing mechanism is actuated for sharing the repository with another user via a sharing user interface.

DETAILED DESCRIPTION

Figure 1:
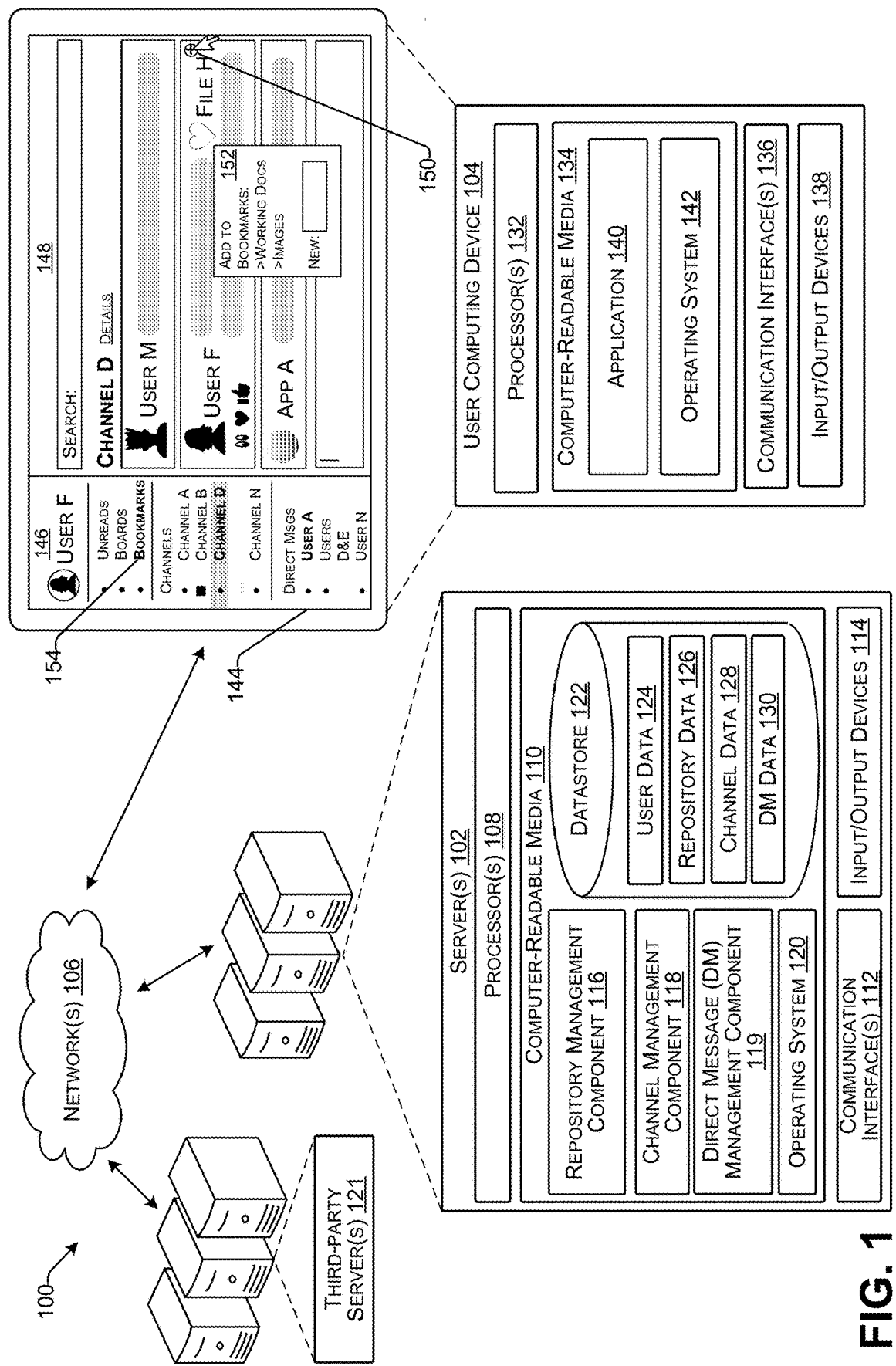
FIG. 1 illustrates an example environment for performing techniques described herein.

A repository to enable quick retrieval of objects of a communication platform is described. A communication platform, which, in some examples can be a group-based communication platform, a channel-based communication platform, a permission-based communication platform, channel-based messaging platform, and/or any other platform for facilitating communication between and among users, can enable users to exchange messages via the communication platform. Users can exchange messages or otherwise collaborate via channels, direct messages, and/or other virtual spaces. That is, such virtual spaces enable users to exchange messages (e.g., converse), share other information or data (e.g., files, images, etc.), interact with and/or otherwise utilize applications and/or workflows, and/or otherwise collaborate with one another. In existing techniques, large amounts of data is exchanged via the communication platform and thus, users may not be able to locate data previously viewed without extensive scrolling or navigation (e.g., opening various channels, direct messages, boards, threads, etc.). That is, in existing techniques, subsequent retrieval of an object or other data associated with the communication platform can be inefficient. The repository described herein enables users of the communication platform to associate objects with the repository for quick retrieval. In some examples, objects associated with a repository can be associated with different channels, direct messages, boards, workspaces, organizations, etc. That is, the repository can store quick links to objects across the communication platform. In some examples, objects can be organized in other repositories associated with the repository. As such, techniques described herein relate to a repository that enables users to associate objects from virtual spaces across the communication platform therewith and/or organize such objects so that such objects can be quickly retrieved, without causing the users to scroll or navigate extensively to access such objects. As described below, the repository, or portions of the repository, can be shared with one or more other users (e.g., a group of users can associate object(s) with a repository or a portion thereof). Further, in some examples, when objects are retrieved using the repository, such objects can be presented "in context" with other object(s) and/or data associated with such objects from their original (e.g., "source") location within the communication platform.

Techniques described herein relate to "bookmarking" or otherwise associating objects—or quick links to objects—with a repository. For the purpose of this discussion, an object can be text, an image, a video, a snippet of content, a user profile, a message, a thread, a file, a channel, a direct message, a board, a virtual space, an invitation, a sign-in request, a workflow, an application, and/or any other data item. As described above, an object can be associated with a channel, direct message, board, workspace, organization, etc. and can be aggregated (e.g., in the repository) with object(s) from the same or different channel(s), direct message(s), board(s), workspace(s), organization(s), etc. That is, object(s) associated with the repository can be associated with virtual spaces across the communication platform to which a user with which the repository is associated has access. In at least one example, a repository can comprise a user-defined set of objects that can be organized and/or arranged for the user. In some examples, repositories can be associated with multiple users. In some examples, repositories can be associated with virtual spaces, such as channels, direct messages, boards, and/or the like.

In at least one example, one or more objects can be associated with a repository. In some examples, such an "association" can be accomplished by storing, or otherwise associating, object identifier(s) and/or resource locator(s) associated with the object(s) in a repository. In at least one example, a repository user interface element representative of the repository can be presented via a user interface of the communication platform. The repository user interface element can be interactable (e.g., associated with an actuation mechanism) to enable a user to view which object(s) are associated therewith. In some examples, object user interface elements can be presented with the repository user interface element, with or without the repository user interface element being first selected.

In at least one example, each object user interface element can be interactable (e.g., associated with an actuation mechanism) such that when an interaction therewith is detected, the communication platform can utilize a resource locator associated with the object to retrieve the object for presentation via the user interface of the communication platform. In some examples, the object can be presented via the user interface "in context," that is, with other objects that were posted within a threshold amount of time of the object and/or data otherwise related to the object. As an example, if the object is a message in a channel, upon retrieval from the repository, the message can be presented in the channel with other messages posted close in time to the message. Or, as another example, if the object is a thread message associated with a message, upon retrieval from the repository, the thread message can be presented with the message and/or one or more other thread messages associated therewith. In this way, a user can retrieve an object and context associated therewith based on an interaction with a repository user interface element and/or an object user interface element associated therewith. That is, in some examples, actuation of an actuation mechanism associated with an object user interface element can enable the user to "jump back" to the virtual space where the object was originally presented, with the same data associated therewith.

As an example, the repository described herein can be associated with an application or other component of the communication platform. A user, or a group of users, can add object(s) to the repository. That is, the user, or a group of users, can request object(s) be associated with the repository. The object(s) can be associated with different channels, direct messages, boards, workspaces, organizations, etc. That is, the repository can be a centralized location from which the user, or the group of users, can quickly retrieve object(s) from across the communication platform. In some examples, the object(s) can be organized into other repositories or partitions of the repository. For example, the object(s) can be organized into folders. The other repositories (e.g., folders) can be associated with time, date, topic, etc. In some examples, the other repositories can be manually curated and/or organized by a user, or group of users, such that the repository is organized in a useful and relevant for the user, or the group of users. In some examples, the other repositories can be automatically curated and/or organized by the communication platform (e.g., which can be informed by machine-learning and/or data associated with users of the communication platform). In any event, the repository can be a structured, centralized location from which a user, or a group of users, can quickly retrieve object(s) from across the communication platform (and in some examples, integrated third-party platforms) quickly and without extensive search or navigation.

In some examples, a repository can be associated with multiple users, who may be associated with a same group (e.g., same group identifier), such that each of the users can associate objects with the repository. As such, a group of users can associate objects that are important to their collaboration and/or communication with a repository to enable each of the users to quickly retrieve and access the objects. In some examples, a repository can be sharable such that a user can share their repository, or a portion thereof, with another user. In some examples, the other user can be associated with a same group (e.g., same group identifier) as the user or a different group (e.g., a different group identifier) as the user. That is, in some examples, the repository can be internally or externally shared.

Techniques described herein enable users to have quick access to objects they deem important for subsequent recall via a repository. The repository described herein can provide a technical improvement to existing techniques. As described above, in some examples, a user interface of the communication platform can present a data feed indicating messages posted to and/or actions taken with respect to a particular channel, direct message, or the like. In existing techniques, the user interface can be cluttered and overwhelming to users. In existing techniques, the user interface can require users to scroll and/or otherwise navigate through data—from users, applications, and/or the like—to understand context of the communication and effectively utilize the communication platform. In existing techniques, if a user desires to access an object after the object is posted to the communication platform, the object can be difficult to locate for subsequent access and/or retrieval. In existing techniques, the user can be required to access multiple channels, messages, threads, etc. to locate and/or retrieve the object. This can be time consuming and resource consumptive (i.e., opening multiple channels, messages, threads, scrolling, etc.). As such, scrolling and/or other navigation can cause poor user experiences and can be inefficient.

The repository described herein enables users to "bookmark" objects such that they are accessible via the repository associated with the communication platform. As described above, such objects can be associated with one or more channels, direct messages, boards, threads, workspaces, organizations, and/or the like. The repository can be organized so that users can quickly access objects that are important without having to extensively scroll or otherwise navigate through data as described above. In view of the foregoing, the repository described herein can provide an improved user experience and improved user efficiency in interacting with user interfaces as described herein.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such as a group of users having sole access to a particular channel, message, and/or other virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other, within private virtual spaces such as one or more communication channels, for example.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, a workspace can be associated with multiple organizations. In some examples, an organization can be associated with multiple workspaces.

In at least one example, the server(s) 102 can communicate with a user computing device 104 via one or more network(s) 106. That is, the server(s) 102 and the user computing device 104 can transmit, receive, and/or store data (e.g., content, messages, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a repository management component 116, a channel management component 118, a direct message (DM) management component 119, an operating system 120, and a datastore 122. In some examples, additional or alternative components can be stored in the computer-readable media, for managing additional or alternative objects associated with the communication platform. For instance, an application management component can manage applications and/or integrations thereof, a board management component can manage boards, as described herein, and/or the like.

In at least one example, the repository management component 116 can receive a request to associate an object with a repository. In some examples, such an object can be "bookmarked" for future reference such that by "bookmarking" the object (i.e., associating it with the repository), a user can quickly access the object without having to browse or search for the object extensively. In at least one example, an object can be associated with an object identifier and/or resource locator. The object identifier and/or resource locator can be stored in, or otherwise associated with, the repository such that when a request to access the object is received, the repository management component 116 can retrieve the object using the object identifier and/or resource locator.

As described above, an object can be text, an image, a video, a snippet of content, a user profile, a message, a thread, a file, a channel, a direct message, a board, a virtual space, an invitation, a sign-in request, an application, a workflow, and/or any other data item. In some examples, an object can be associated with a virtual space, which can comprise a channel, a direct message, a board, or the like. In some examples, an object can be a first-party object or a third-party object.

A "first-party object" can be associated with the communication platform. That is, the communication platform can be a "first-party platform." In some examples, an object associated with a repository can be a "third-party object," such that the object is associated with a "third-party platform." A third-party platform can be external to the first-party platform (e.g., a different entity or organization, outside the control or authority of the first-party platform, etc.) and can be associated with the third-party server(s) 121, as illustrated in FIG. 1. In at least one example, a third-party platform can host, store, manage, or otherwise own one or more objects. That is, an object created by a third-party platform can be a "third-party object" and can be hosted, stored, managed, or otherwise owned by the third-party platform. In some examples, a third-party object can be associated with the communication platform by the provision of a resource locator associated with the third-party object, a drag and drop action associated with the third-party object (e.g., dragging the third-party object from the third-party resource to the communication platform), uploading the third-party object from a storage repository, and/or the like. In at least one example, a third-party object can be integrated in the communication platform (e.g., via one or more application programming interfaces (API(s)) and/or the like) such that the third-party object can be accessed from within the communication platform. In some examples, third-party objects that can be associated with the communication platform can be determined by permission(s) provided by an administrator or the like. Additional details associated with the integration of third-party platforms with the communication platform are described with reference to U.S. patent application Ser. No. 17/111,408, filed on Dec. 3, 2020, the entire contents of which are incorporated by reference herein.

In at least one example, the repository management component 116 can receive a request to associate an object with a repository. In some examples, such a request can be received in response to an interaction with a user interface element proximate the object in a virtual space. In some examples, such a user interface element can be interactable (e.g., associated with an actuation mechanism) such that when an interaction therewith is detected, the repository management component 116 can cause a configuration user interface to be presented to enable the user to associate the object with the repository. In some examples, the repository can be one of a plurality of repositories and the configuration user interface can enable the user to select (e.g., via a selection mechanism) one of the plurality of repositories with which to associate the object. In some examples, the configuration user interface can include an input mechanism from which the user can provide an input for generating a new repository. In some examples, the input can comprise a name for the new repository. In at least one example, based at least in part on receiving an indication of a repository (e.g., selected or newly generated) and an object for associating with the repository, the repository management component 116 can associate an object identifier and/or a resource locator of the object with the repository. In some examples, the object identifier and/or resource locator of the object can be mapped to, or otherwise associated with, a repository identifier of the repository.

In some examples, a request to associate an object with a repository can be received via a user interface element proximate a repository user interface element representative of the repository. In some examples, such a user interface element can be interactable (e.g., associated with an actuation mechanism) such that when an interaction associated therewith is detected, the repository management component 116 can cause a configuration user interface to be presented to enable the user to associate the object with the repository. In some examples, a user can provide a resource locator, or other object identifier, associated with an object for associating with the repository. In some examples, a user can drag and drop an object into a repository (e.g., by dragging an object user interface element representative of an object to a repository user interface element and/or the configuration user interface and terminating the dragging gesture proximate thereto) to associate the object with the repository. In some examples, a user can perform a search for an object (e.g., from within the configuration user interface) to select an object for association with a repository. In addition to identifying an object for association with the repository, in some examples, a user can select the repository from a plurality of other repositories or provide an input for a new repository to be generated via the configuration user interface as described above.

In some examples, an object can be associated with a repository without using the configuration user interface. For instance, a user can drag and drop an object directly into a repository, for example, by dragging an object user interface element representative of the object to a repository user interface element representative of the repository and terminating the gesture proximate thereto. In such an example, the drag and drop gesture can represent a "request" to associate the object with the repository. In some examples, an object can be associated with a user interface element that is interactable to enable a user to add the object to the repository simply via interaction with the user interface element. As an example, an object can be associated with text, an icon, an image, or the like that (i) indicates that the object can be added to the repository and (ii) can facilitate the addition thereto in response to an actuation of an actuation mechanism associated therewith. In at least one example, actuation of the actuation mechanism can represent a "request" to associate the object with the repository. In some examples, a user may be prompted to confirm the addition of the object to the repository (e.g., via another interaction with the user interface). In some examples, an object can be associated with a repository in response to a spoken request (e.g., "associate that message with my bookmarks") or the like.

In some examples, a repository can be associated with a user (i.e., a user account of a user). That is, a repository identifier can be mapped to, or otherwise associated with, a user identifier, which can be associated with a user account of the user. In such examples, the user can add, remove, or edit object(s) associated with the repository. In some examples, a repository can be associated with multiple users (e.g., user accounts of the multiple users). For example, a repository identifier can be mapped to, or otherwise associated with, multiple user identifiers, each which can be associated with a user account of a user. In some examples, a repository identifier can be mapped to, or otherwise associated with, a group identifier. In at least one example, the group identifier can represent a workspace and/or an organization. In such an example, users associated with the group identifier can add, remove, or edit object(s) associated with the repository, based at least in part on permission(s) associated with the repository and/or the user(s). In some examples, a repository can be associated with two or more group identifiers. That is, in some examples, a repository can be a cross-workspace repository or a shared repository, wherein the repository can be associated with users having different group identifiers and/or objects associated with different group identifiers. As described herein, in some examples, a repository can be associated with a channel, direct message, board, or other virtual space.

In at least one example, the repository management component 116 can cause a repository user interface element, representative of the repository, to be presented via a user interface of the communication platform. In some examples, the repository user interface element can be interactable (e.g., associated with an actuation mechanism) to cause other repository user interface element(s) representative of repository(s) associated therewith and/or object user interface element(s) representative of object(s) associated therewith to be presented via the user interface. In some examples, when an object is added to a repository, an object user interface element can be presented via the user interface without any interaction with the repository user interface element. In some examples, each object user interface element can be interactable (e.g., associated with an actuation mechanism) such that when an interaction therewith is detected, the repository management component 116 can retrieve the object, using an associated resource locator. In some examples, the object can be retrieved from the datastore 122 and/or the third-party server(s) 121. In at least one example, a user can request to access a third-party object from a user interface of the communication platform. The repository management component 116 can retrieve the third-party object from the third-party platform and can cause the third-party object to be presented via the user interface, such that the user can view, edit, or otherwise interact with the third-party object via the user interface.

In at least one example, the repository management component 116 can cause the object to be presented in the user interface of the communication platform. That is, the repository management component 116 can cause the object to be presented in a section of the user interface or instead of the user interface (e.g., the object can be presented via a takeover). In some examples, the object can be presented "in context" such that one or more other objects that are associated with a same virtual space and/or timestamp(s) within a threshold period of time of the timestamp of when the object was posted to a virtual space can be presented with the object. That is, in some examples, based at least in part on selecting an object, a portion of the virtual space with which the object is associated and/or "contextual data" that is relevant to the object (e.g., based at least in part on date, time, topic, a relevance metric, etc.) can be presented with the object in the user interface. Additional details are provided below.

In some examples, repositories and objects associated therewith can be sharable with other users of the communication platform. As described below, in some examples, a configuration user interface can be associated with an actuation mechanism that, when actuated, can enable at least a portion of the repository to be shared to other users, other groups of users, and/or the like. In at least one example, the repository management component 116 can associate user identifier(s) of user(s) with whom the repository is shared with the repository identifier of the repository. As used, herein, a user can be associated with a user account, which can be associated with a user identifier. For the purpose of this discussion, sharing a repository and/or an object with a user can refer to sharing the repository and/or the object with a user account of the user. In at least one example, as described above, "sharing" can be effectuated by mapping, or otherwise associating, a user identifier (e.g., associated with the user and user account) with an identifier of the repository and/or object. Additional details are provided below.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform, such as content, messages, and/or the like. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, etc.). An announcement channel can comprise a channel in which users can post announcements.

In some examples, a channel can be associated with a defined group of users within a same organization. Such a communication channel can be referred to as an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared channel" or an "externally shared channel" can refer to a communication channel which is accessible across different organizations, wherein an "internal channel" or "internally shared channel" can refer to a channel which is accessible within the same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared communication, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message (DM) management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform. In some examples, a direct message can be a private message between one or more users of the communication platform. In some examples, a direct message may be "shared," which may allow users associated with two or more different groups (e.g., entities associated with two or more different organization and/or workspace identifiers) to join and participate in the data sharing through the direct message. In at least one example, a "direct message" can refer to a private virtual space through which one or more direct messages or other communications can be exchanged between one or more users.

In at least one example, the direct message (DM) management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message (DM) management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, repository data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In some examples, the user data 124 can store indications of subscription(s) with which individual users are associated. In at least one example, the user data 124 can store associations between user identifiers and identifiers of repositories associated therewith.

In at least one example, the user data 124 can include permission data indicative of permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, restrictions on subscriptions, permitted features of subscriptions, which object(s) the user is permitted to access, restrictions on object access, and the like. In at least one example, the permissions can support the communication platform by maintaining security for limiting access to a defined group of users. In some examples, such users can be defined by common access credentials, group identifiers, or the like, as described above.

In some examples, the datastore 122 can store permission data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, group permissions can be mapped to, or otherwise associated with, user profiles associated with such groups.

In at least one example, the repository data 126 can store data associated with repositories (e.g., and objects associated therewith). In at least one example, the repository data 126 can store associations between repository(s) and/or object(s). In some examples, each repository can be associated with an indication of an "owner" of the repository (e.g., the user who generated the repository and has permissions to modify contents of the repository), user identifier(s) of user(s) associated with the repository, group identifier(s) of group(s) associated with the repository, object identifier(s) of object(s) associated with the repository, permission(s) associated with the repository, etc.

In some examples, each object can be associated with an indication of an "owner" of the object (e.g., a platform and/or application storing and/or serving notifications associated therewith), at least one of a user identifier, a group identifier, a channel identifier, a direct message identifier, a board identifier, or the like associated with the object, object interface(s) with which the object is associated (e.g., object interface identifier(s) associated therewith), a resource locator associated with the object, notification data (e.g., frequency, priority, presentation preferences, etc.), etc. In some examples, an authorization indicator (e.g., a flag, token, etc.) can be associated with an object, thereby indicating that the object is authorized for access by a particular user, group of users, virtual space, etc. In some examples, an authentication indicator (e.g., a token, etc.) can be associated with an object, thereby indicating that a particular user and/or user computing device is authenticated (e.g., by a third-party platform) for receiving notifications associated with the object.

In some examples, the repository data 126 can store indications of which third-party platforms can be integrated into the communication platform for particular users, groups (e.g., organizations, workspaces), channels, direct messages, and/or the like. In some examples, such repository data 126 can be set by administrators or other users having particular roles associated with the ability to set permissions.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored.

In some examples, the channel data 128 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In some examples, the channel data 128 can store indications of object(s) associated with particular channels and/or object interface(s) associated therewith.

In at least one example, the DM data 130 can store data associated with individual direct messages. In at least one example, the direct message (DM) management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored. In some examples, the DM data 130 can store indications of objects(s) associated with particular direct messages and/or object interface(s) associated therewith.

In some examples, the datastore 122 can be partitioned into discrete items of data that may be accessed and managed individually (e.g., data shards). Data shards can optimize the efficacy in which technical tasks may be performed, such as data retention, accessing data, and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared communication channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time.

In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc. In some examples, communication interface(s) 112 can facilitate real-time text (RTT) such that text and/or other data can be transmitted instantly, or substantially instantly, as it is typed or created.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein, which in some examples can be rendered based at least in part on instructions received from the server(s) 102. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

A non-limiting example of a user interface 144 is shown in FIG. 1. As illustrated in FIG. 1, the user interface 144 can present data associated with one or more channels, direct messages, and/or other virtual spaces associated with the communication platform. In some examples, the user interface 144 can include a first section 146 (e.g., which can be a portion, pane, or other partitioned unit of the user interface 144), that includes user interface element(s) representing channel(s), direct message(s), and/or other virtual space(s) (e.g., boards, etc.) with which the user (e.g., account of the user) is associated. Additional details associated with the first section 146 and associated indications(s) are described below with reference to FIG. 2.

In at least one example, the user interface 144 can include a second section 148 (e.g., which can be a portion, pane, or other partitioned unit of the user interface 144) that can present data associated with virtual spaces as described herein. In some examples, the second section 148 can be associated with a data feed indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) and/or application posted a message or otherwise caused the message to be posted and/or performed an action. In examples where the second section 148 presents data associated with multiple workspaces, at least some data can be associated with an indication of which workspace the data is associated with.

In some examples, the second section 148 can be associated with a virtual space, such as a board, which can present data in a configuration different from a data feed. Additional details associated with boards and/or such data presentation are described below. That is, the second section 148 can present additional or alternative data in additional or alternative configurations than are described with reference to FIG. 1.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2.

In at least one example, an object presented via the user interface 144 can be associated with a user interface element 150. In some examples, the user interface element 150 can be interactable (e.g., associated with an actuation mechanism), such that interaction with the user interface element 150 can trigger the presentation of a configuration user interface 152 and/or otherwise enable the object to be associated with a repository. In at least one example, the configuration user interface 152 can include a selection mechanism and/or an input mechanism to enable a user to designate a repository with which to associate the object. In at least one example, based at least in part on associating the object with the designated repository, the object can be subsequently accessed without the user needing to search or browse for the object extensively in other virtual spaces of the communication platform. In some examples, the repository can be represented by a repository user interface element 154 presented via the user interface 144. The repository user interface element 154 can be interactable (e.g., associated with an actuation mechanism) to enable a user to access object(s) associated with the repository. In at least one example, the object can be accessed via an interaction with the repository user interface element 154. Additional details are described below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc. In some examples, communication interface(s) 136 can facilitate RTT such that text and/or other data can be transmitted instantly, or substantially instantly, as it is typed or created.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the repository management component 116, the channel management component 118, the direct message (DM) management component 119, and the application 140, techniques described herein can be performed by any other component, or combination of components, which can be associated with the server(s) 102, the user computing device 104, or a combination thereof.

Figure 2A:
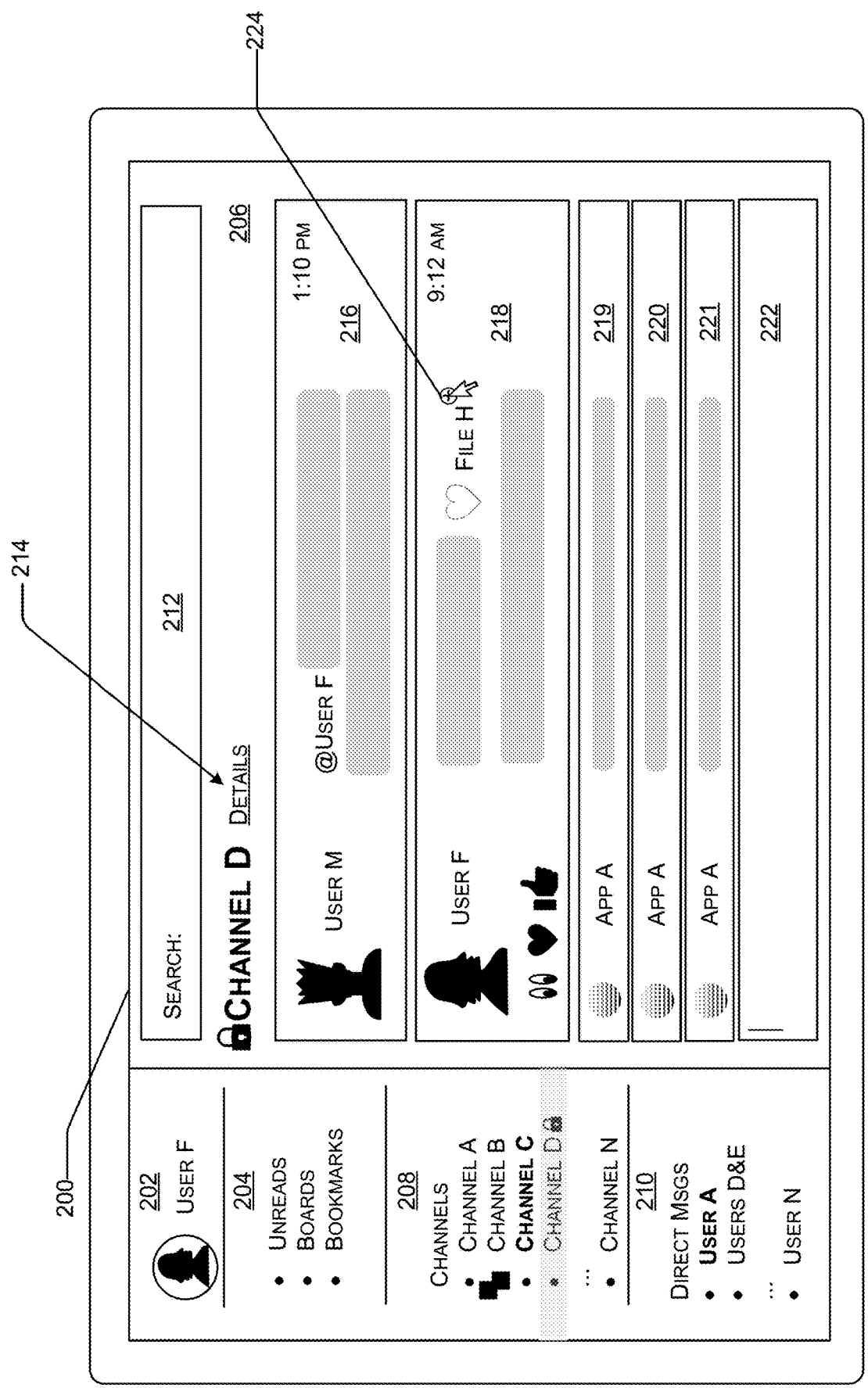
FIG. 2A illustrates an example of a user interface presented via a communication platform, as described herein.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) with which the user (e.g., user identifier of the user) is associated. In at least one example, the first section 202 can include one or more subsections, which can include user interface element(s) representative of different virtual spaces. For example, a first subsection 204 can include user interface elements representing virtual spaces that can aggregate data associated with a plurality of channels and/or workspaces. In at least one example, each virtual space can be associated with a user interface element in the first subsection 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with one or more of the workspaces with which the user is associated. That is, in some examples, if the user requests to access the virtual space associated with "unreads," all data that has not been read (e.g., viewed) by the user can be presented in the second section 206, for example in a data feed or other configuration.

In another example, a virtual space can be associated with "boards" with which the user is associated. In at least one example, if the user requests to access the virtual space associated with "boards," one or more boards with which the user is associated can be presented via the user interface 200.

In at least one example, boards, as described herein, can be associated with individual groups and/or channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a channel and at least some members of the channel can view and/or edit the board. In some examples, a board can be sharable such that data associated with the board is accessible to and/or interactable for members of the multiple channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In at least one example, "bookmarks" can be associated with one or more repositories, as described herein. In some examples, "bookmarks" can correspond to a single repository associated with one or more objects. In some examples, "bookmarks" can refer to multiple repositories, wherein individual of the repositories are associated with one or more objects. In some examples, "bookmarks" can refer to a combination of object(s) and repository(s). In some examples, objects and repositories can be represented by user interface elements that are presented via the user interface. In at last one example, an object associated with the one or more repositories of the "bookmarks" can be associated with an object identifier and/or resource locator to enable quick retrieval. That is, in some examples, "bookmarks" enable users to organize objects, object identifiers, and/or resource locators associated therewith for quick retrieval without extensive searching or navigating. In some examples, "bookmarks" can be personal to the user. However, as described below, in some examples, "bookmarks" can be shared with other users and/or associated with multiple users (e.g., a group of users).

As described above, in some examples, "bookmarks" can refer to one or more repositories. In some examples, a single repository can be partitioned into one or more other repositories which can be "related" to the repository. In at least one example, multiple repositories can be associated with a same "level." In some examples, individual of the multiple repositories can be hierarchically related. In at least one example, one or more repositories can be "parent" repositories to one or more "child" repositories. In some examples, a "child" repository can be associated with one or more "grandchild" repositories, and so forth. For example, in at least one example, a repository can be a folder and can be associated with one or more sub-folders. In an example, a sub-folder can be associated with another sub-folder (i.e., a sub sub-folder). In at least one example, the organization of multiple repositories and/or arrangement of such repositories can be performed manually by a user. In at least one example, such organization and/or arrangement can be performed by the repository management component 116 (e.g., "automatically" without additional input from the user). In some examples, organization and/or arrangement of repositories (or content associated therewith) can be based on machine-trained models trained on user data of users of the communication platform.

In some examples, individual of the repositories can be associated with one or more objects. In some examples, as described above, such objects can be associated with one or more channels, one or more direct messages, one or more boards, one or more groups, one or more organizations, etc. In some examples, objects can be hierarchically related to one another and/or repositories, as described herein. In some examples, such relationships can be manually configured (e.g., by a user or a group of users). In some examples, such relationships can be automatically configured (e.g., by the repository management component 116). In some examples, contents of the one or more repositories can be manually curated. In some examples, contents of the one or more repositories can be automatically curated (e.g., by the repository management component 116). In some examples, such automatic curation can be based at least in part on machine-trained models and/or user data associated with users of the communication platform.

In an example, not shown in FIG. 2A, in at least one example, the first subsection 204 can include a user interface element associated with "apps," which can be associated with applications that are integrated with the communication platform and accessible to the user (e.g., based on permission data). In some examples, if the user requests to access the virtual space associated with "apps," one or more indications of one or more applications that are integrated with and accessible to the user can be presented via the user interface 200. In at least one example, the repository described herein can be provided via an application and, in such an example, the repository user interface element can be presented in association with the "apps" user interface element in the first subsection 204 or another subsection.

In another example, also not shown in FIG. 2A, the first subsection 204 can include a user interface element associated with "threads," which can be associated with messages, files, etc. posted in threads to messages posted in a channel, and/or "mentions and reactions," which can be associated with messages or threads where the user (e.g., User F) has been mentioned (e.g., via a tag) or another user has reacted (e.g., via an emoji, reaction, or the like) to a message or thread posted by the user. In some examples, the first subsection 204 can be associated with a user interface element representing "snippets of content," which can be associated with snippets of audio and/or video content provided by users associated with the communication platform.

In some examples, data associated with the various virtual spaces described above can be organized and/or sortable, when presented in the second section 206, by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) and/or application posted the message, performed an action, and/or the like. Additional details are described below.

In at least one example, the first section 202 of the user interface 200 can include a second subsection 208 that includes user interface elements representing channels to which the user has access. In some examples, the channels can include public channels, private channels, announcement channels, shared channels (e.g., between organizations), single workspace channels, cross-workspace channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second subsection 208 can depict all channels, or a subset of all channels, that the user has permission to access (e.g., as determined by the user data 124). In such examples, the channels can be arranged alphabetically, based on most recent interaction, based on frequency of interactions, based on channel type (e.g., public, private, shared, cross-workspace, etc.), based on workspace, in user-designated sections, or the like. In some examples, the second subsection 208 can depict all channels, or a subset of all channels, that the user is a member of, and the user can interact with the user interface 200 to browse or view other channels that the user is not a member of but are not currently displayed in the second subsection 208. In some examples, a new channel, generated subsequent to a request received at the channel management component 118 in FIG. 1 and accessible to the user, can be added to the second subsection 208. The new channel can be generated by the user or added to the second subsection 208 in response to acceptance of an invite sent to the user to join a new channel. In some examples, different types of channels (e.g., public, private, shared, etc.) can be in different sections of the second subsection 208, or can have their own subsections in the user interface 200. In some examples, channels associated with different workspaces can be in different portions of the second subsection 208, or can have their own sections or subsections in the user interface 200.

In some examples, the user interface elements representing channels can be associated with additional or alternative user interface elements that visually differentiate types of channels. For example, the user interface element representing Channel B is associated with a double square user interface element instead of a circle user interface element (like the user interface elements representative of the other channels). As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical user interface elements can be used to differentiate between public channels, private channels, shared channels, channels associated with different workspaces, and the like. In other examples, channels that the user is not a current member of may not be represented in the second subsection 208 of the user interface 200. In such examples, the user may navigate to a different interface (not shown) to browse additional channels that are accessible to the user but to which the user is not currently a member.

In some examples, individual of the user interface elements representative of channels can be associated with one or more other user interface elements for communicating information to a user. For instance, a user interface element (e.g., a lock) can be associated with the user interface element corresponding to Channel D, which can indicate that the channel is a private channel. The user interface elements illustrated in FIG. 2A are non-limiting examples of user interface elements that can be associated with the user interface 200 to communicate information to a user.

In addition to the second subsection 208, the first section 202 can include a third subsection 210 that can include user interface elements representative of direct messages. That is, the third subsection 210 can include user interface elements representative of virtual spaces that are associated with private messages between one or more users, as described above.

The first section 202 can include any number of subsections which can be arranged in the same or different format. In some examples, a subsection can correspond to all shared virtual spaces, virtual spaces shared with different organizations or groups, etc. In some examples, a subsection can correspond to applications integrated with the communication platform, boards, unreads, etc. That is, in some examples, each of the virtual spaces and/or aggregations of data described above can be presented in their own subsection. In some examples, a repository user interface element representative of a repository (e.g., "bookmarks") can be presented in the first subsection 204, as shown, or can be accessible from any other subsection as described herein. Further, in some examples, each virtual space can be associated with its own repository, wherein a repository user interface element representative thereof can be presented in association with the virtual space.

As described above, in at least one example, the user interface 200 can include a second section 206 that, in some examples, can be associated with a data feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user and/or application posted the message and/or performed an action. In some examples, the message posted by an application may indicate a status of an event (e.g., pending, in review, completed, etc.) as further discussed below.

For purposes of this discussion, a "message" can comprise an object provided by a user using the user computing device 104 and/or an application that is configured for display within a channel, direct message, and/or other virtual space for facilitating communications. A message may include any text, image, video, audio, or combination thereof provided by a user (using a user computing device), or a status of an event. For instance, the user may provide a message that includes text, an image, and/or a video, within the message as message contents. In such an example, the text, image, and/or video can comprise the message. Each message sent or posted to a channel of the communication platform can include metadata comprising a sending user identifier (e.g., identifying a sending user or an originating user), a receiving user identifier (e.g., identifying a receiving user or entity), a message identifier (e.g., identifying the message), a group identifier (e.g., identifying a group with which the message is associated), a channel identifier (e.g., identifying a channel with which the message is associated), a direct message identifier (e.g., identifying a direct message with which the message is associated), or the like. In at least one example, each of the foregoing identifiers may comprise American Standard Code for Information Interchange (ASCII) text, a pointer, a memory address, or the like. In at least one example, such metadata can include additional or alternative data including, but not limited to, message contents, an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc. In at least one example, messages can be represented by user interface elements in the user interface 200.

In some examples, a user can comment on a message in a "thread." A thread can be a message associated with another message that is not posted to a channel, but instead is maintained within an object associated with the original message. Messages and/or threads can be associated with file(s), emoji(s), application(s), etc. and can be viewed based on an interaction with a user interface element representative of the thread. In some examples, such a user interface element can be associated with an actuation mechanism that when actuated can cause the threaded messages to be presented via the user interface 200. In some examples, the threaded messages can be presented via a third section of the user interface 200.

A channel, direct message, or other virtual space can be associated with data and/or content other than messages, or data and/or content that is associated with messages. For example, non-limiting examples of additional data that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc. Indications of such additional data and/or actions can present as messages and can be represented by user interface elements in the user interface 200.

In some examples, applications and/or other services integrated into the communication platform can perform actions and/or otherwise provide data that can be presented via the second section 206. In some examples, such actions and/or other data can be associated with events. In some examples, such actions and/or other data can present as messages. That is, actions performed by applications and/or services can be represented by user interface elements in the user interface 200. For example, an update to an object can be associated with a message presented via the second section 206. In another example, the completion of a task performed via an application can be associated with a message that can be presented via the second section 206. That is, the second section 206 can present messages associated with users and/or applications. In some examples such messages, and associated metadata, can be referred to as "events." In some examples, such applications and/or services can be third-party applications and/or services.

As described above, individual messages (from users, applications, and/or the like) can be associated with metadata. Such metadata can include identifier(s), an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc. In at least one example, such metadata can be appended to the individual messages when they are received by the server(s) 102. That is, in such an example, an originating source can generate and/or associate metadata with a message prior to sending it to the server(s) 102. In at least one example, metadata can be generated by the server(s) 102 and associated with the message by the server(s) 102. In some examples, metadata associated with a message can be generated in part by the originating source and in part by the server(s) 102. In some examples, the metadata can be used for determining how to present a message in the user interface 200. For example, messages with different priorities indicated in associated metadata can be presented with different presentation characteristics (e.g., size, font, color, animation, in a message digest (or not), etc.). In some examples, metadata associated with a message can be used for annotating the user interface 200, searching, filtering, and/or triggering workflows.

In some examples, the second section 206 can comprise a data feed associated with a single channel. In such examples, data associated with the channel can be presented via the data feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.). In some examples, presentation characteristics can appear differently to different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification. The search can be performed with one or more shards associated with each group across which the search is performed.

In FIG. 2A, the user can interact with the user interface element that corresponds to Channel D in the second subsection 208 and as such, a data feed associated with the channel can be presented via the second section 206 of the user interface. In some examples, the second section 206 can be associated with a header that includes user interface elements 214 representing information associated with Channel D. Furthermore, the second section 206 can include user interface elements 216, 218, 219, 220, and 221, which each represent messages posted to the channel. As illustrated, the user interface elements 216-221 can include an indication of a user and/or application that posted the message, a time when the message was posted, content associated with the message, reactions associated with the message, and/or the like. In at least one example, the second section 206 can include an input mechanism 222, which can be associated with a message composition user interface to enable a user to compose a message to be posted to the channel. While described above as a private, internal channel, in some examples, Channel D can be a public channel, an externally shared channel, an announcement channel, or the like. Channel D is merely provided for illustrative purposes.

Figure 2B:
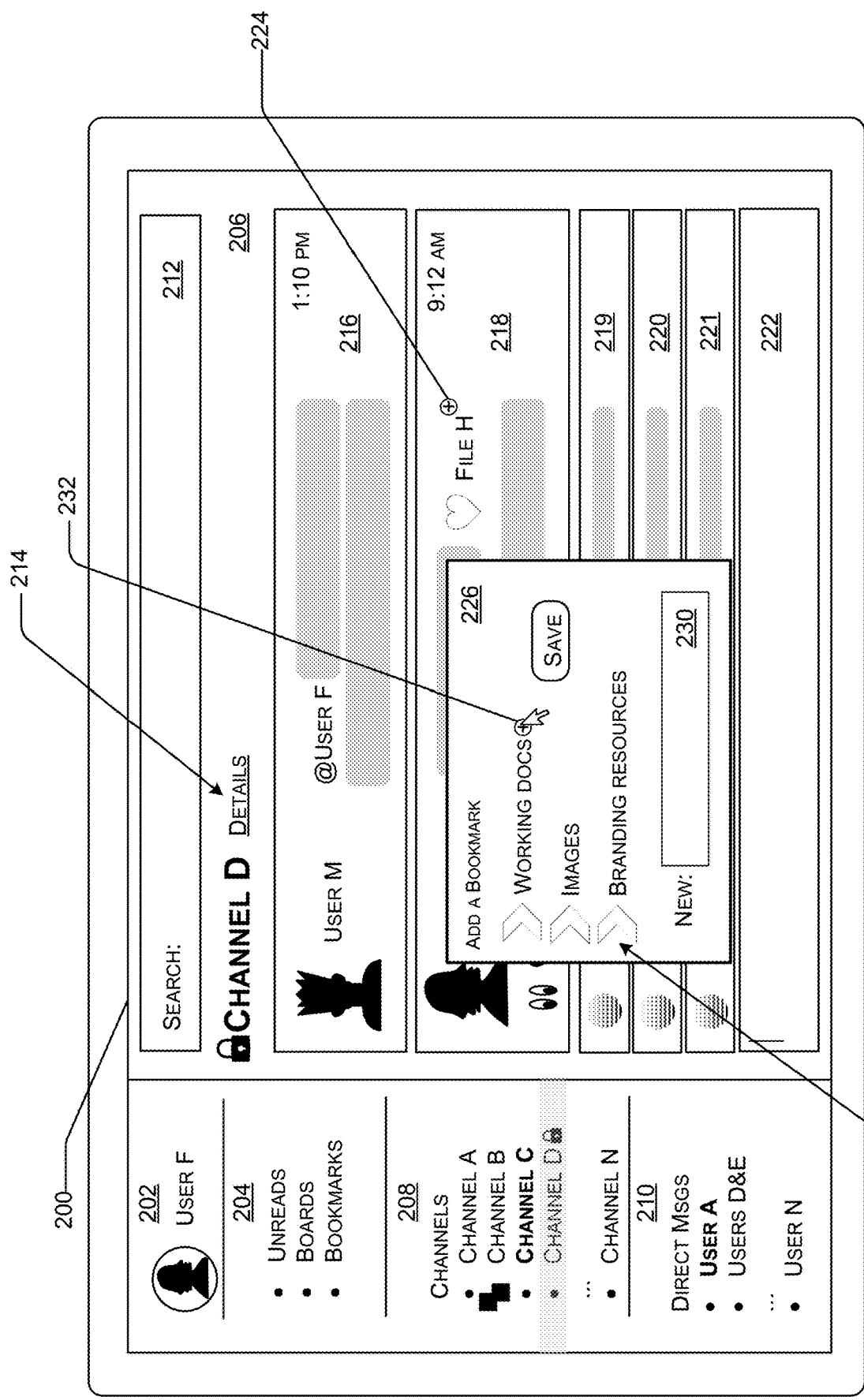
FIG. 2B illustrates an example of a configuration user interface, presented via the user interface of FIG. 2A, for associating an object with a repository, as described herein.

In at least one example, objects associated with the communication platform can be associated with user interface elements, such as user interface element 224, which can enable a user to add objects to a repository. In some examples, the user interface element 224 can be interactable (e.g., associated with an actuation mechanism) such that when an interaction with the user interface element is detected, the repository management component 116 can cause a configuration user interface 226 to be presented via the user interface 200, as illustrated in FIG. 2B. In some examples, such a user interface element 224 can be configured differently than as shown in FIG. 2A. For example, a user interface element representative of a message can be associated with a user interface element to enable a user to perform one or more operations associated with the message (e.g., delete the message, edit the message, save the message, pin the message, etc.). In some examples, associating the message with a repository (e.g., "bookmarking" the message) can be one of the operations. In some examples, a user can right click on an object and the repository management component 116 can cause the configuration user interface 226 to be presented via the user interface 200. That is, FIG. 2A illustrates one example for triggering the presentation of the configuration user interface, but additional or alternative examples are within the scope of this disclosure.

In some examples, the configuration user interface 226 can enable a user to add the object (e.g., File H) to a repository (e.g., to "bookmark" the object for subsequent retrieval). In some examples, the configuration user interface 226 can be presented as a pop-up, as illustrated in FIG. 2B. In some examples, the configuration user interface 226 can be presented as an overlay, a section of the user interface 200, a new user interface, etc. In some example, the configuration user interface 226 can present repository user interface elements 228 representative of one or more existing repositories. In some examples, the repository user interface elements 228 can be presented via a drop down or other mechanism for enabling a user to view the one or more repository user interface elements 228. In some examples, each of the repository user interface elements 228 can be interactable (e.g., associated with an actuation mechanism) to enable a user to select the repository with which the object (e.g., File H) is to be associated (e.g., via interaction with an actuation mechanism associated therewith). That is, the configuration user interface 226 can be associated with a selection mechanism to enable users to select which pre-existing repository an object is to be associated with. In some examples, the configuration user interface 226 can include an input mechanism 230 to enable a user to provide a name for a new repository to be generated. In some examples, the object (e.g., File H) can be associated with the new repository. Additional details are provided below.

Figure 2C:
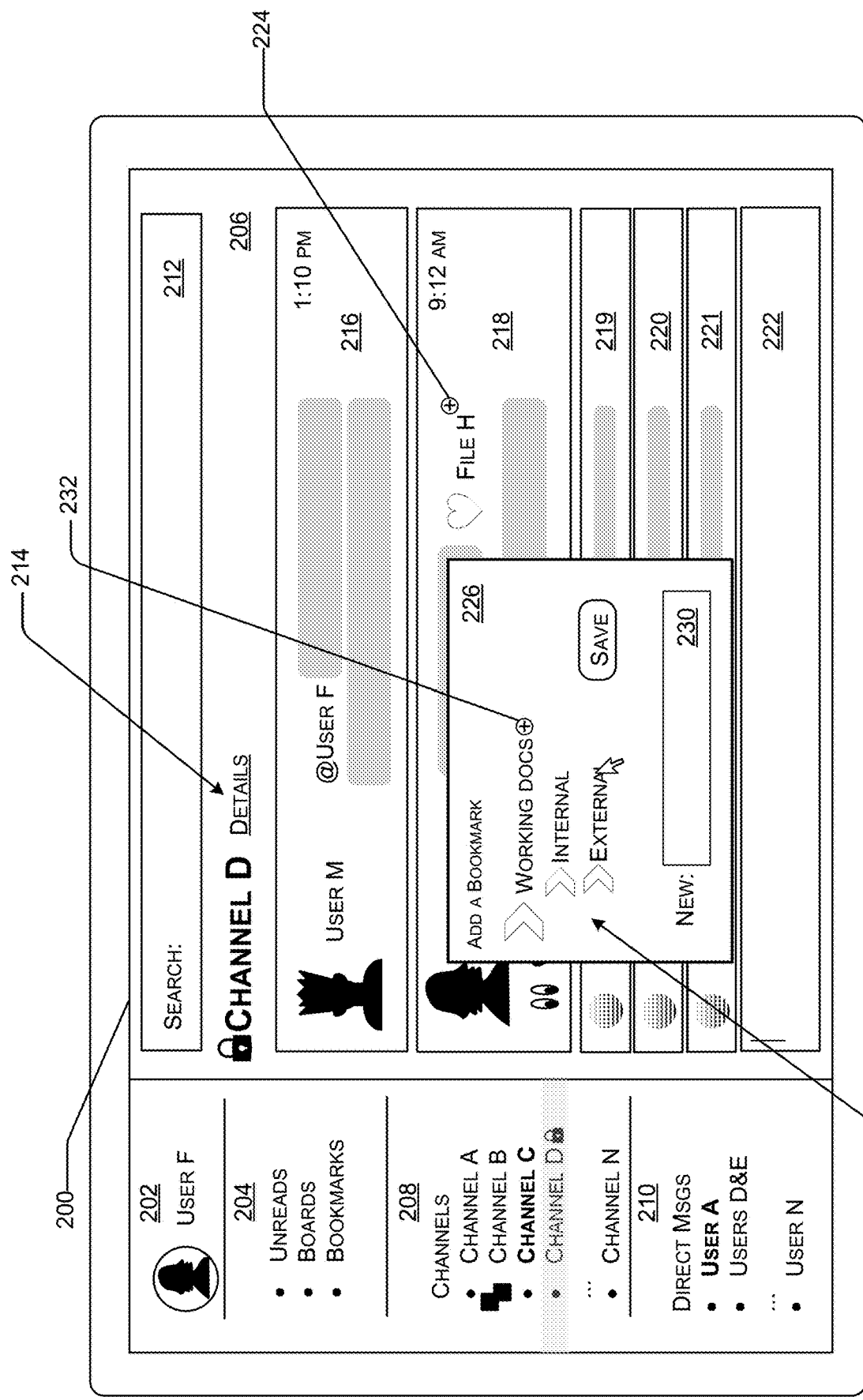
FIG. 2C illustrates another example of the configuration user interface of FIG. 2B, wherein a user can utilize a selection mechanism to associate an object with a preexisting repository, as described herein.
Figure 2D:
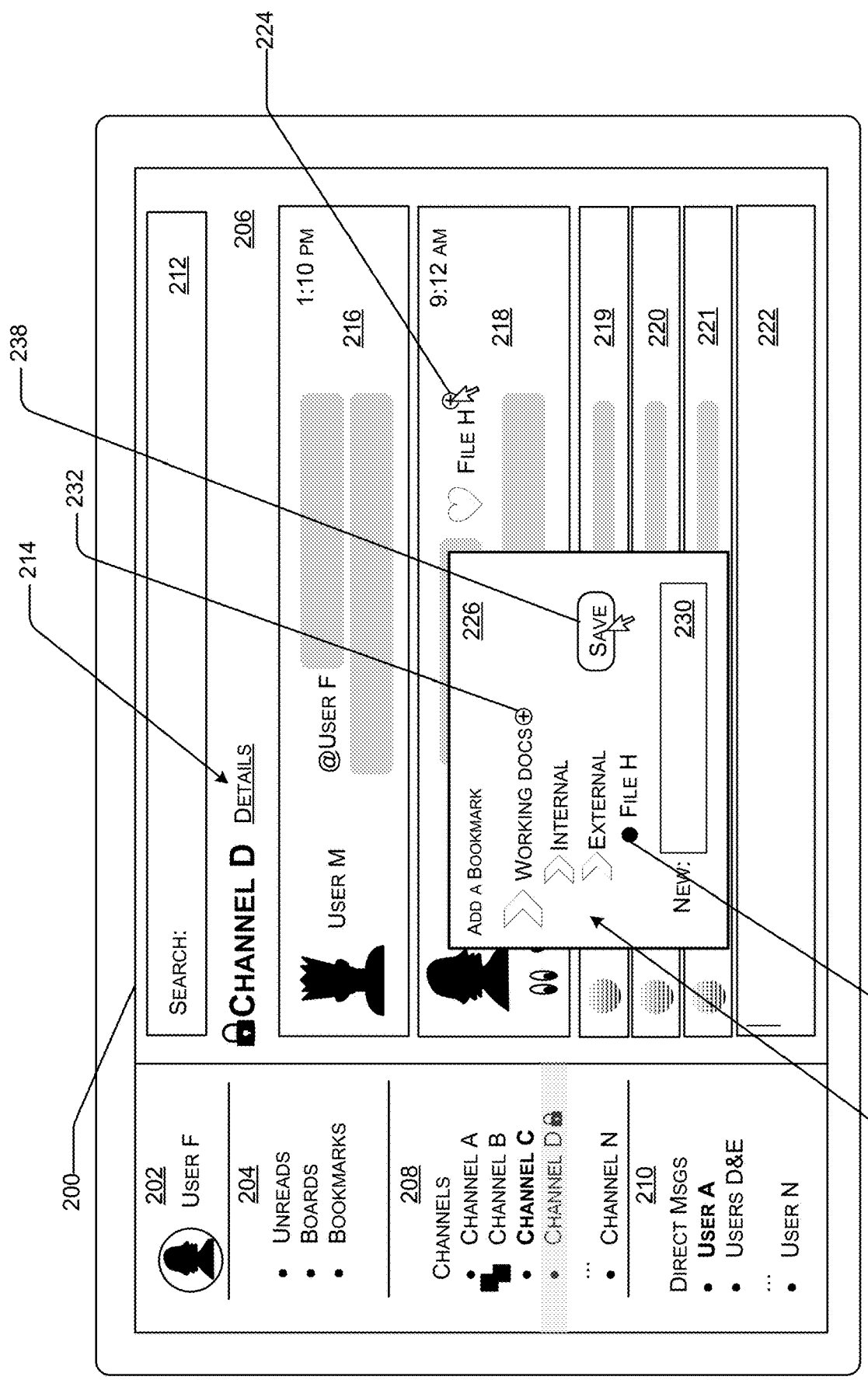
FIG. 2D illustrates another example of the configuration user interface of FIG. 2B, wherein a user can utilize a selection mechanism to associate an object with a preexisting repository, as described herein.

In some examples, as described above, a repository can be associated with one or more other repositories. In some examples, the repository and the one or more other repositories can be hierarchically related, for example, as parent, child, and so forth. In some examples, a repository user interface element can be associated with a user interface element 232 indicating that the repository is associated with one or more other, related repositories and/or objects. In at least one example, the user interface element 232 can be interactable (e.g., associated with an actuation mechanism) such that when an interaction therewith is detected, one or more additional repository user interface elements 234 can be presented via the configuration user interface 226, as illustrated in FIG. 2C. In at least one example, a user can select an existing repository (e.g., "external") with which to associate the object. In at least one example, based at least in part on selecting an existing repository, the repository management component 116 can cause the configuration user interface 226 to be updated to include an object user interface element 236 representative of the object (e.g., File H), as illustrated in FIG. 2D.

In at least one example, the configuration user interface 226 can include a control 238 that can be interactable (e.g., associated with an actuation mechanism) to enable the user to save the association between the object and the designated repository. In at least one example, based at least in part on receiving an input associated with the control 238, the repository management component 116 can associate the object with the repository. In some examples, such an association can be a mapping between an object identifier and a repository identifier. In some examples, such an association can be a mapping between a resource locator of the object and a repository identifier.

Figure 2E:
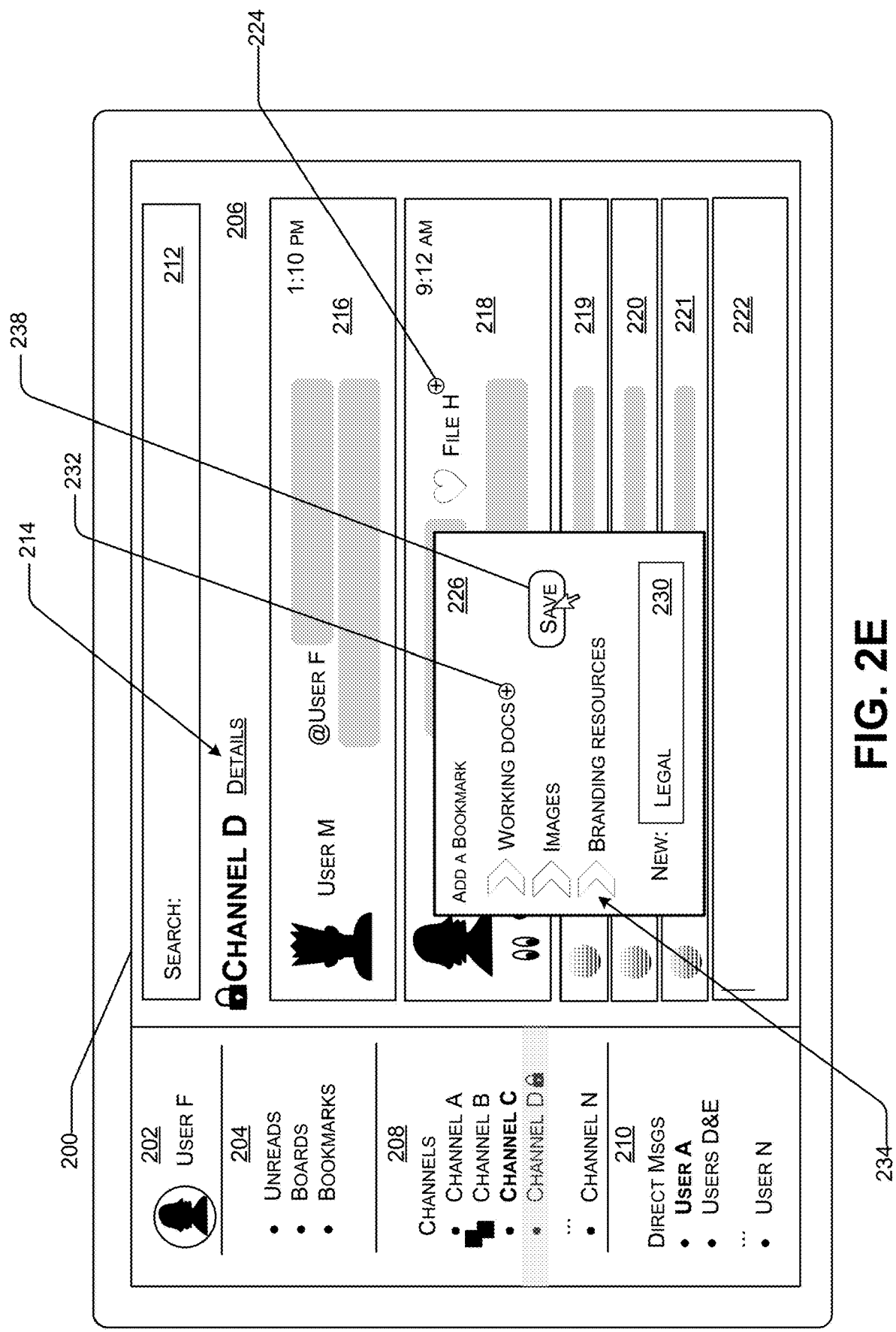
FIG. 2E illustrates another example of the configuration user interface of FIG. 2B, wherein a user can utilize an input mechanism to associate an object with a to-be-generated (i.e., new) repository, as described herein.
Figure 2F:
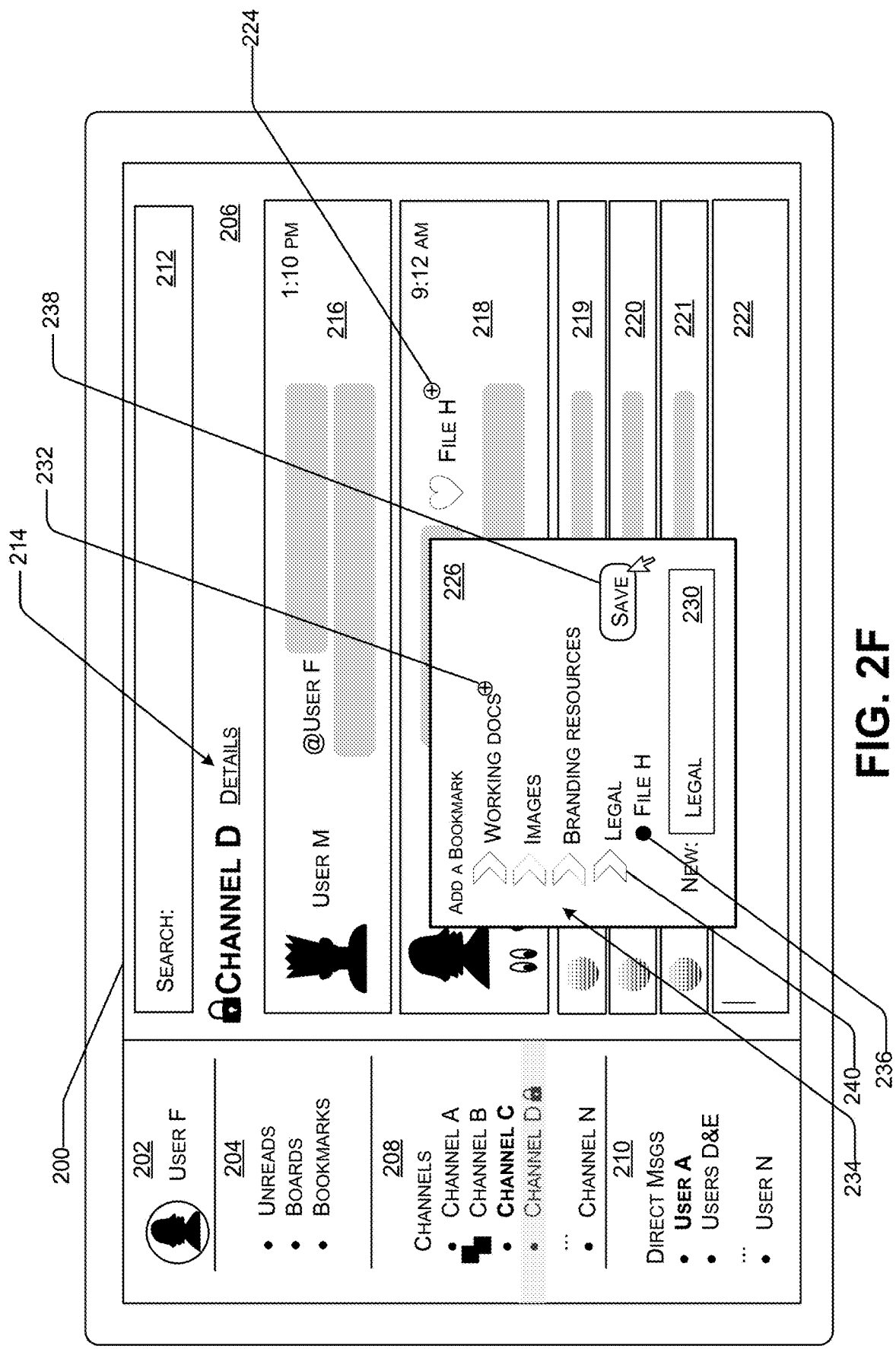
FIG. 2F illustrates another example of the configuration user interface of FIG. 2B, wherein a user can utilize an input mechanism to associate an object with a new repository, as described herein.

In some examples, a user may desire to generate a new repository with which to associate an object. FIG. 2E illustrates an example where a user can input a name for a new repository into the input mechanism 230. In at least one example, based at least in part on receiving an input via the input mechanism 230 (and, in some examples, the control 238), the repository management component 116 can generate a new repository and associate the object with the new repository. That is, the repository management component 116 can create a new repository identifier and associate the object identifier and/or a resource locator of the object with the new repository identifier. In at least one example, the repository management component 116 can cause a new repository user interface element 240 representative of the new repository (e.g., "Legal") to be presented via the configuration user interface 226, as illustrated in FIG. 2F. In at least one example, an object user interface element 236 representative of the object can also be presented via the configuration user interface 226, for example, in association with the new repository.

Figure 3A:
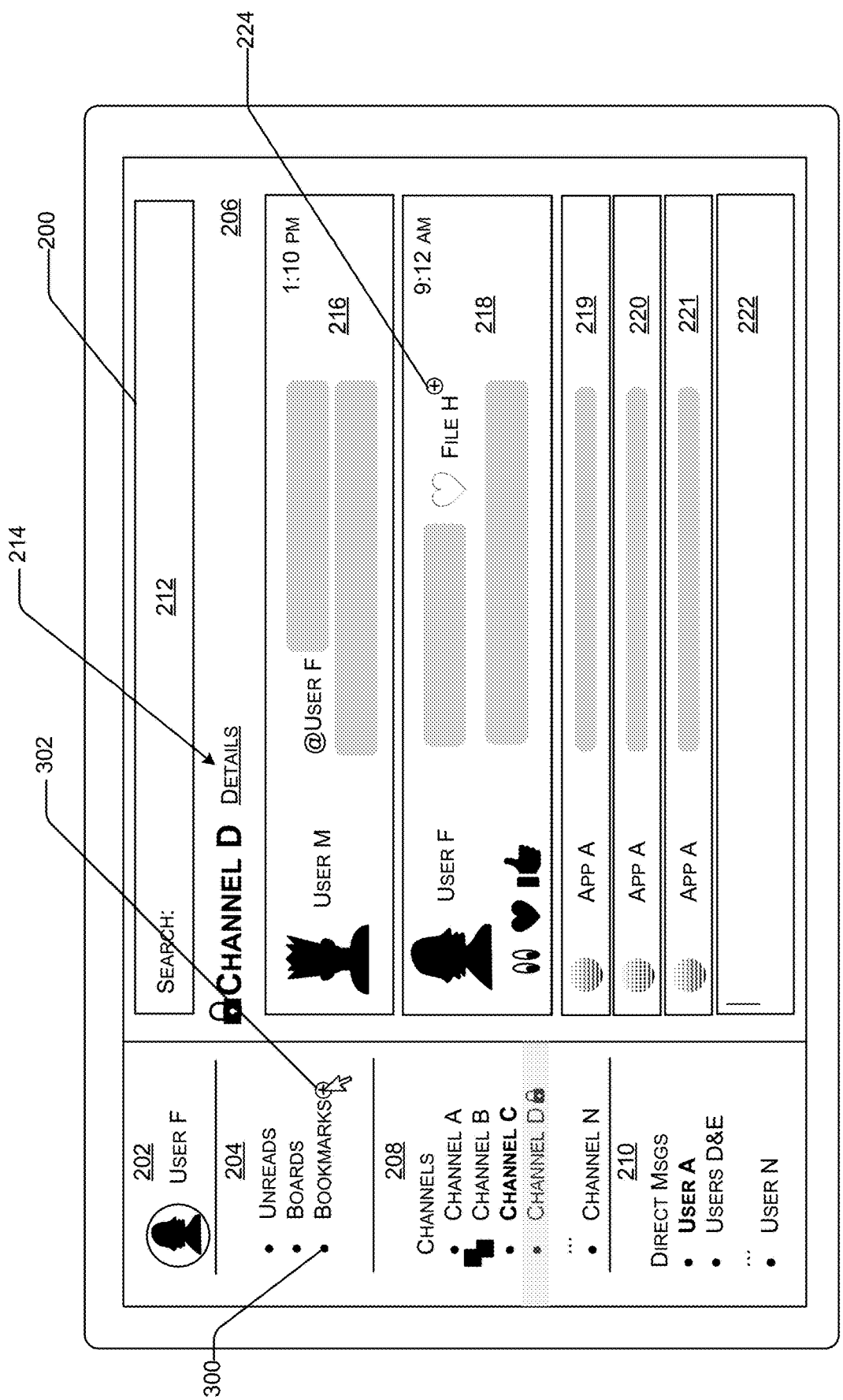
FIG. 3A illustrates an example of a repository user interface element representative of a repository presented via the user interface of FIG. 2A, as described herein.
Figure 3B:
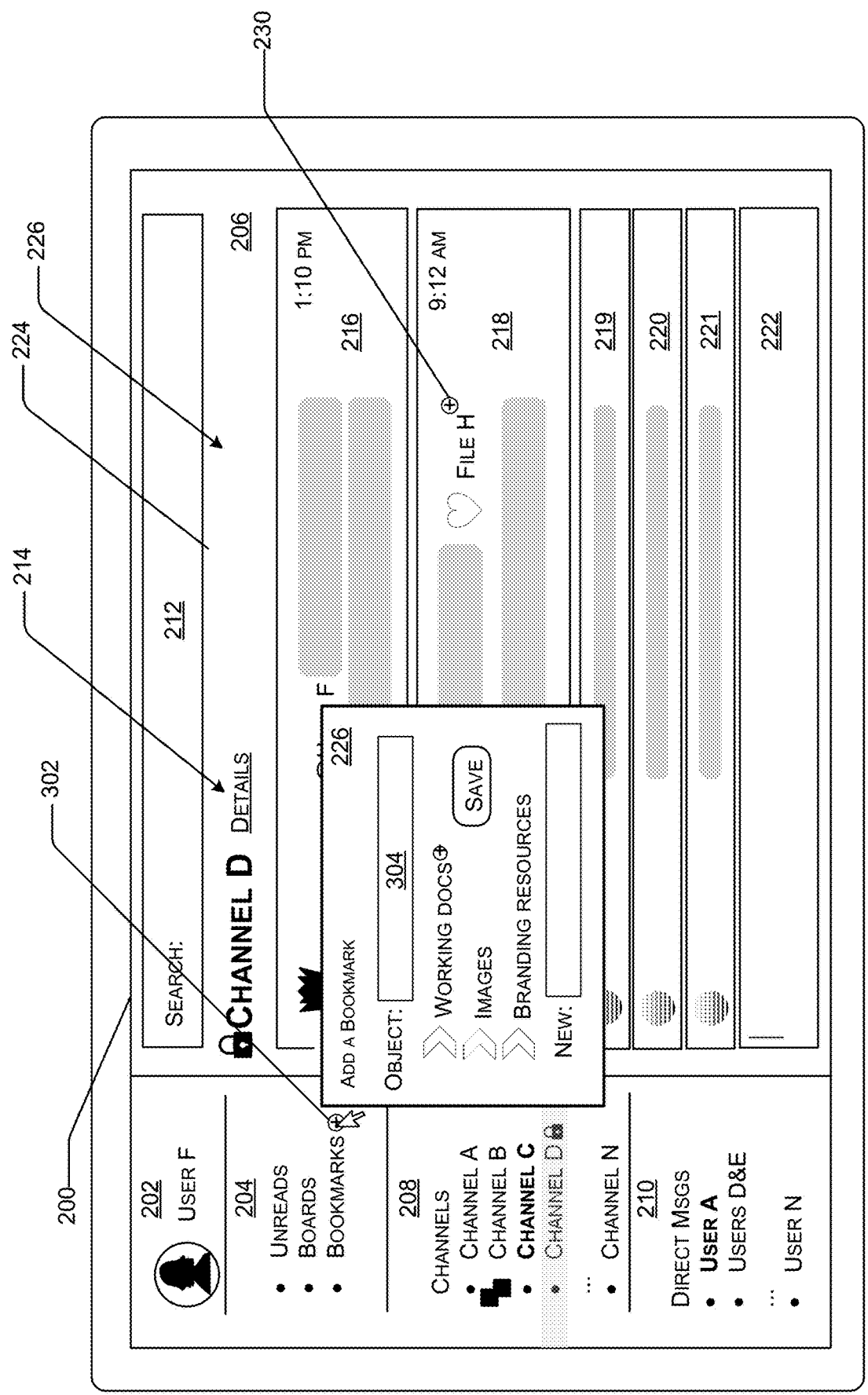
FIG. 3B illustrates an example of a configuration user interface presented via the user interface of FIG. 2A, as described herein.

Objects can be associated with repositories via various mechanisms. In some examples, as described above with reference to FIG. 2A, a user can interact with a user interface element 224 (e.g., actuate an actuation mechanism associated therewith), which can trigger the presentation of a configuration user interface 226. In some examples, a repository user interface element 300 representative of the repository can be associated with a user interface element 302 that can be interactable (e.g., associated with an actuation mechanism), as illustrated in FIG. 3A. In at least one example, based at least in part on detecting an interaction with the user interface element 302 (e.g., actuation of an actuation mechanism associated therewith), the repository management component 116 can cause the configuration user interface 226 to be presented to enable a user to associate an object therewith, as illustrated in FIG. 3B.

In some examples, when triggered from the user interface element 302, the configuration user interface 226 can be configured differently than when triggered from a user interface element proximate an object. For example, the configuration user interface 226 can include an input mechanism 304 for a user to add a resource locator associated with an object or otherwise identify an object to associate with the repository. In some examples, a user can upload an object for association with the repository via the configuration user interface 226. In some examples, a user can drag and drop an object into a repository (e.g., by dragging an object user interface element to a repository user interface element and/or the configuration user interface 226 and terminating the dragging gesture proximate thereto) to associate the object with the repository. In some examples, a user can perform a search for an object (e.g., from within the configuration user interface 226) to select an object for association with a repository. In addition to identifying an object for association with the repository, in some examples, a user can select the repository from a plurality of other repositories or provide an input for a new repository to be generated via the configuration user interface 226.

As described above, an object can be associated with a repository without using the configuration user interface 226. For instance, a user can drag and drop an object directly into a repository, for example, by dragging an object user interface element representative of the object to a repository user interface element representative of the repository and terminating the gesture proximate thereto. In such an example, the drag and drop gesture can represent a "request" to associate the object with the repository. In some examples, an object can be associated with a user interface element that is interactable to enable a user to add the object to the repository simply via interaction with the user interface element. As an example, an object can be associated with text, an icon, an image, or the like that (i) indicates that the object can be added to the repository and (ii) can facilitate the addition thereto in response to an actuation of an actuation mechanism associated therewith. In at least one example, actuation of the actuation mechanism can represent a "request" to associate the object with the repository. In some examples, a user may be prompted to confirm the addition of the object to the repository (e.g., via another interaction with the user interface). In some examples, an object can be associated with a repository in response to a spoken request (e.g., "associate that message with my bookmarks") or the like.

Figure 4:
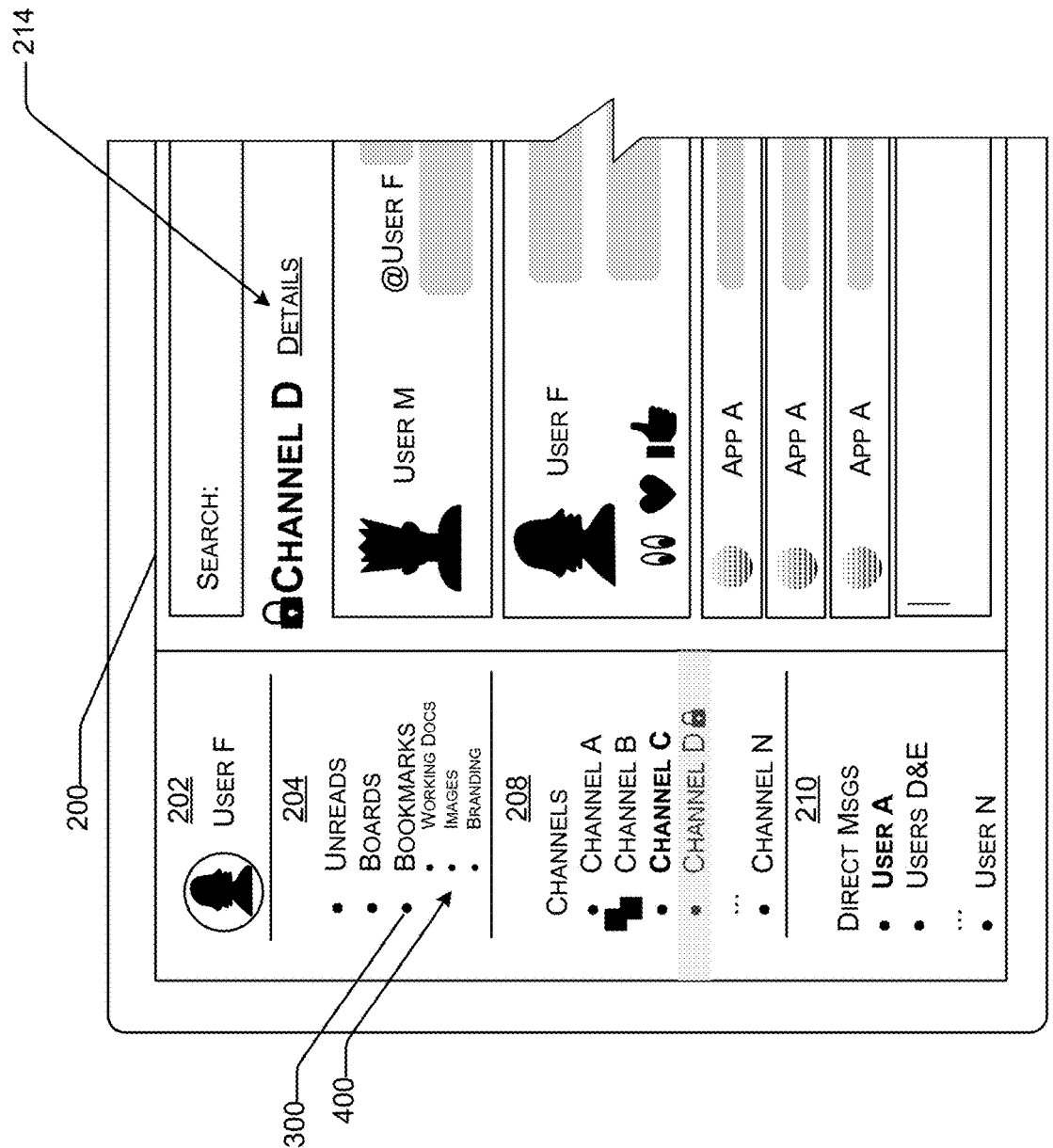
FIG. 4 illustrates an example of a repository user interface element representative of a repository, and object user interface element(s) representative of related repository(s) or object(s), presented via the user interface of FIG. 2A, as described herein.

FIG. 4 illustrates an example, wherein the repository and other repository(s) and/or object(s) associated therewith are accessible via the user interface 200. As referenced in FIG. 3A, a repository user interface element 300 representative of a repository associated with at least a user can be presented via the user interface 200. That is, when a user (e.g., User F) accesses the communication platform (e.g., via the application 140 on their user computing device 104), the communication platform can determine which repository(s) are associated with the user identifier of the user. As described above, a user identifier can be mapped to, or otherwise associated with, one or more repository identifiers. Each repository identifier can be mapped to, or otherwise associated with, one or more other repository identifiers and/or one or more object identifiers. In some examples, an object identifier can comprise a resource locator associated with the corresponding object. In some examples, an object identifier can be associated with a resource locator.

Based at least in part on determining which repository(s) the user identifier is associated with, the repository management component 116 can cause one or more repository user interface elements to be presented via the user interface 200. In some examples, a single repository user interface element 300 can be presented via the user interface 200 (e.g., regardless of whether the repository represented is associated with other repository(s) and/or object(s)). In some examples, the repository user interface element 300 can be presented with one or more other user interface elements 400. In some examples, the other user interface element(s) 400 can be presented whenever the repository user interface element 300 is presented. In some examples, a user can interact with the repository user interface element 300 or another user interface element associated therewith to cause the expansion or collapse of the other user interface element(s) 400.

In some examples, the other user interface element(s) 400 can be representative of one or more other repositories associated therewith. In some examples, the other user interface element(s) 400 can be representative of one or more objects associated with the repository. In some examples, the other user interface element(s) 400 can be representative of one or more other repositories and/or one or more other objects. In some such examples, repositories and objects can be associated with visual indicators to differentiate between the two. In some such examples, repositories and objects may not be presented with any sort of differentiation.

In some examples, the repository user interface elements 300 and/or 400 can be presented in a hierarchical relationship, wherein a first (repository) user interface element 300 is a parent to one or more second user interface elements 400 (i.e., children), and so forth. In some examples, the user interface elements 400 can include all repositories and/or objects associated with the repository represented by the repository user interface element 300. In some examples, the user interface element 400 can represent a subset of the repositories and/or objects associated with the repository represented by the repository user interface element 300. In some examples, the subset can comprise a subset of repositories and/or objects associated with a particular level (of a hierarchy). In some examples, the subset can comprise a subset of repositories and/or objects most recently accessed (e.g., as determined by timestamp(s) being within a threshold period of time of a current system time), most frequently interacted with (e.g., interactions that satisfy a threshold), most relevant (e.g., based on a relevance metric), user designated, etc. In some examples, the user can interact with the repository user interface element 300 to access additional or alternative repositories and/or objects than those represented by the user interface elements 400.

As described above, in at least one example, each object user interface element representative of an object associated with a repository can be associated with a resource locator or other mechanism that enables retrieval of the object. That is, based at least in part on detecting an actuation of an actuation mechanism associated with an object user interface element, the repository management component 116 can retrieve an associated object and cause the object to be presented via the user interface 200. Additional details are provided below.

In FIG. 4, the user interface elements 300 and 400 are shown as being presented in the first subsection 204 of the first section 202. However, in some examples, such user interface elements 300 and/or 400 can be presented can be presented in other subsections of the first section 202, the second section 206, etc., in its own section, or the like.

Figure 5A:
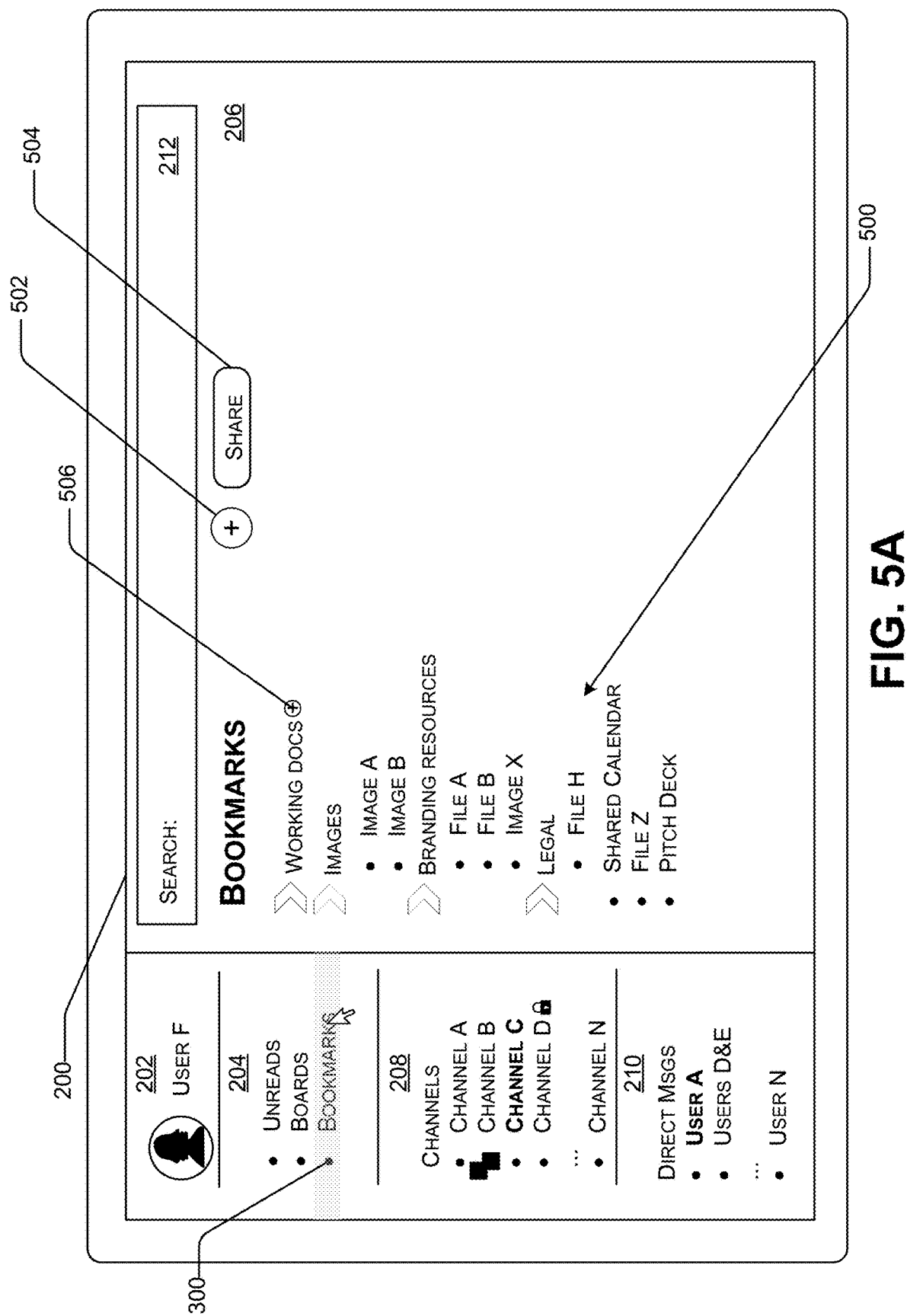
FIG. 5A illustrates another example of the user interface of FIG. 2A, as described herein, wherein a repository user interface element representative of the repository and one or more other user interface elements representative of repository(s) and/or object(s) associated with the repository are presented therein.

FIG. 5A illustrates another example of the user interface 200 of FIG. 2A, as described herein, wherein a repository user interface element representative of the repository and one or more user interface elements representative of other repository(s) and/or object(s) are presented therein. In some examples, based at least in part on detecting an interaction with the repository user interface element 300 (e.g., actuation of an actuation mechanism associated therewith), the repository management component 116 can cause the second section 206 of the user interface 200 to present one or more user interface elements 500 representative of repository(s) and/or object(s) associated therewith. In some examples, as described above, one or more repositories can be related, for example, to a user, a group of users, or the like. In some examples, individual of the one or more repositories can be hierarchically related. In at least one example, the user interface elements 500 can be arranged hierarchically, such that individual repositories and/or objects are associated with one or more levels. In some examples, the levels can represent different levels of importance. In some examples, the levels can be based on differences between repositories and objects associated therewith. In some examples, a first repository can comprise a parent and one or more second repositories and/or objects can comprise children of the parent. That is, in at least one example, the repository(s) described herein can provide a structured format for associating object(s) for subsequent, quick retrieval without searching or navigating (or with reduced searching or navigating).

In at least one example, the user interface 200 can include a user interface element 502 to enable the user to associate a new repository and/or object with the repository as presented via the user interface 200. In some examples, based at least in part on detecting an interaction with the user interface element 502, the repository management component 116 can cause a configuration user interface 226 to be presented via the user interface 200. In some examples, the user interface 200 can include a user interface element 504 to enable the user (e.g., User F) to share at least a portion of the repository with one or more other users. Additional details are provided below.

In at least one example, each of the repository(s) and/or object(s) associated therewith can be represented by user interface elements. In some examples, each of the user interface elements can be associated with an actuation mechanism that when actuated, cause the presentation of additional or alternative data. For example, actuation of an actuation mechanism associated with a repository user interface element can cause contents of the repository represented thereby to be presented via the user interface 200. Such contents can include object(s) and/or other repository(s). In some examples, actuation of an actuation mechanism associated with an object user interface element can cause the object to be presented via the user interface 200. In some examples, based at least in part on detecting an interaction with a user interface element representative of a repository or an object (e.g., a dwell interaction), the repository management component 116 can cause data associated with the repository or object to be presented via the user interface 200. For instance, a dwell interaction associated with an object user interface element (e.g., which can be different than an actuation of an actuation mechanism) can cause an indication of a virtual space associated with the object, a source associated with the object, an application associated with the object, etc. to be presented via the user interface 200.

Figure 5B:
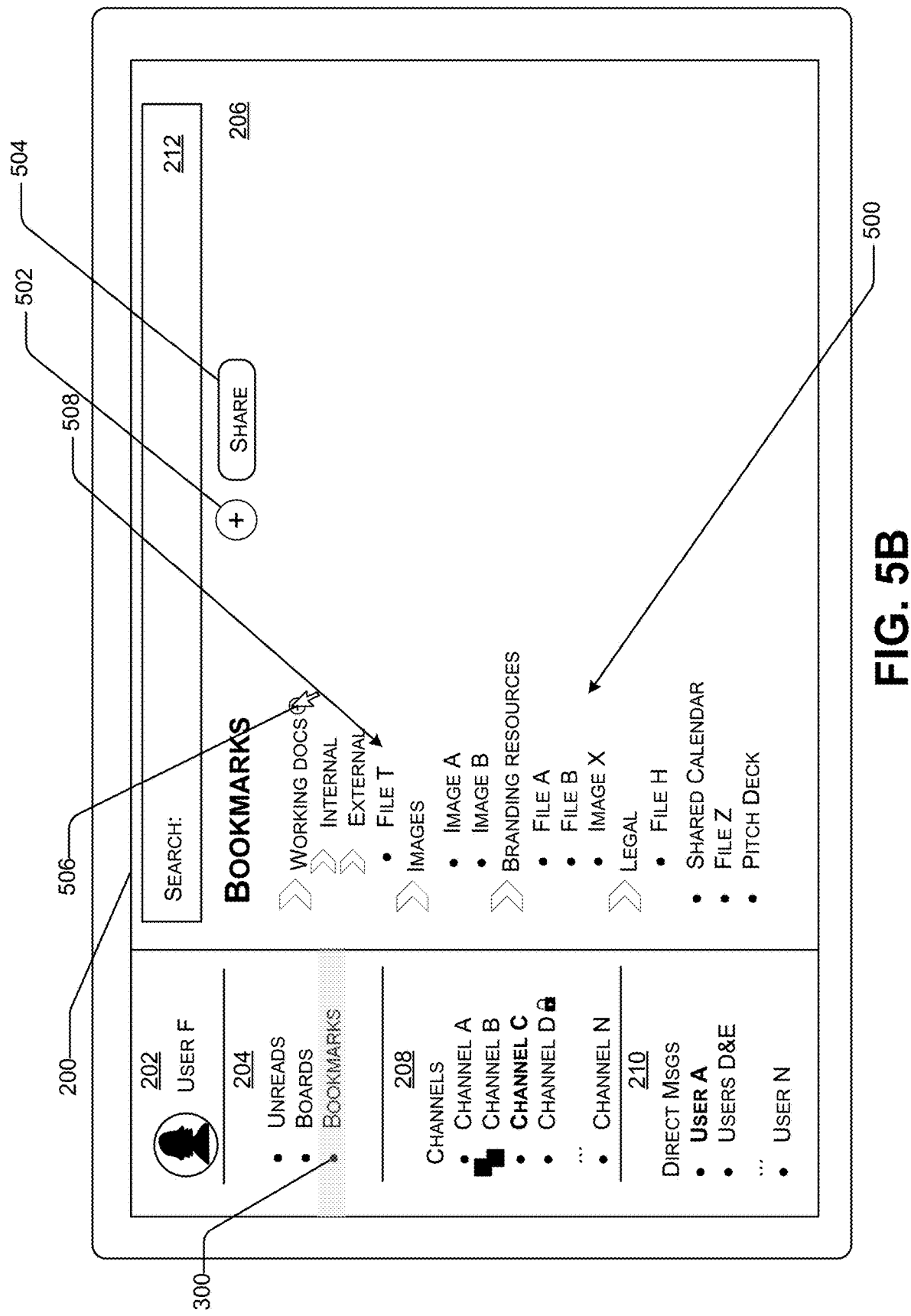
FIG. 5B illustrates another example of the user interface of FIG. 2A, as described herein, wherein a repository user interface element representative of the repository and one or more other user interface elements representative of repository(s) and/or object(s) associated with the repository are presented therein.

In some examples, each of the repository(s) and/or object(s) associated therewith can be represented by user interface elements that are presented whenever the repository user interface element representative of the repository "working docs" is presented via the user interface 200. In some examples, a user can interact with individual of the user interface elements (e.g., the user interface element 506) to access additional or alternative repositories and/or objects. For example, the repository "working docs" is associated with a user interface element 506, interaction with which (e.g., actuation of an actuation mechanism associated therewith) can cause one or more additional user interface elements 508 to be presented via the user interface 200, as illustrated in FIG. 5B. In some examples, the one or more additional user interface elements 508 can represent object(s) or repository(s) associated with the repository. In some examples, the user interface element 506 can be presented based at least in part on a number of repository(s) and/or object(s) associated with the repository "working docs." In some examples, the user interface element 506 can be presented to enable the user to expand or collapse the presentation of the user interface element(s) associated with repository(s) and/or object(s) associated with the repository "working docs."

Figure 5C:
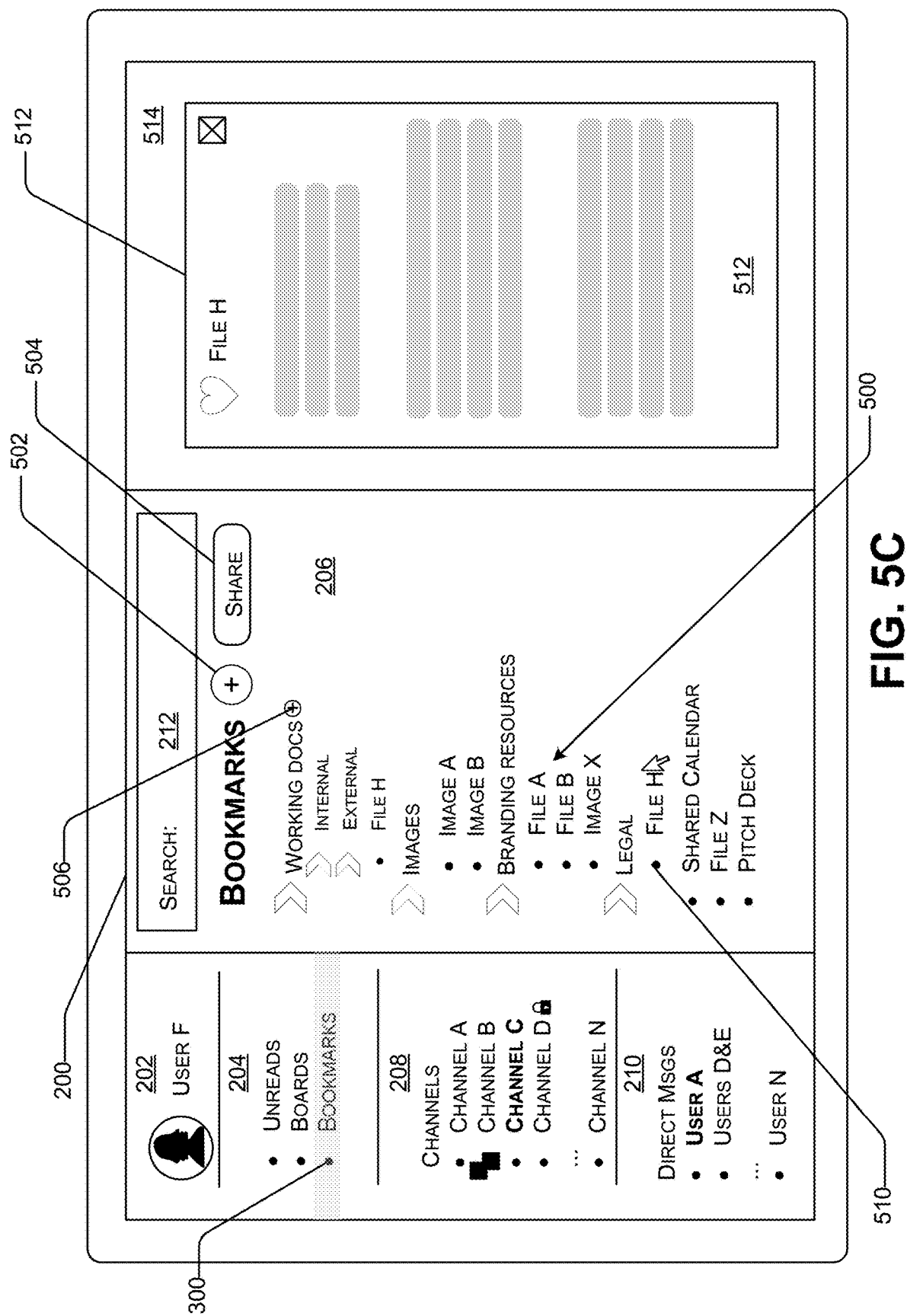
FIG. 5C illustrates another example of the user interface of FIG. 2A, as described herein, wherein an object accessible via an object user interface element of FIG. 5B is presented therein.

In some examples, a user can interact with a user interface element representative of an object (e.g., an object user interface element 510) to cause the object 512 to be presented via the user interface 200, as illustrated in FIG. 5C. As described above, the object user interface element 510 can be associated with an actuation mechanism. Based at least in part on detecting an interaction with the object user interface element 510 (e.g., actuation of the actuation mechanism), the application 140 can send an indication of such to the repository management component 116. In at least one example, the indication can include an object identifier of the object and/or a resource locator for the object. In at least one example, the repository management component 116 can use the resource locator for the object to retrieve the object. In some examples, the object can be stored in association with the communication platform (i.e., a first party object). In some examples, the object can be stored in association with a third-party platform (i.e., a third-party object). In such examples, the repository management component 116 can send a request for the object to the third-party server(s) 121. In at least one example, such a request can be sent via one or more API calls or connections and can include an object identifier and/or resource locator.

In at least one example, based at least in part on retrieving the object, the repository management component 116 can cause the object 512 to be presented via the user interface 200. In some examples, the object 512 can be presented via a new section 514 of the user interface 200. In some examples, the object 512 can be presented via a pop-up, overlay, new user interface, as part of an existing section of the user interface 200, etc. In at least one example, the user can view, edit, and/or otherwise interact with the object 512 via the user interface 200, subject to permission(s) associated with the user and/or the object.

In some examples, based at least in part on receiving an indication of an interaction with an object user interface element, such as the object user interface element 516 the repository management component 116 can cause the object (or a reference thereto) to be presented via the user interface 200 with context. That is, a user interface element 516 representative of the object can be presented via the user interface 200 with data that is related to the object to provide context with respect to the object. In some examples, such "contextual data" can comprise data that is associated with a timestamp that is within a threshold amount of time of a timestamp associated with the object (e.g., indicating when the object was posted to a virtual space), data that is associated with a same message and/or thread identifier (e.g., thread messages), data that is associated with a same virtual space (e.g., channel, direct message, board, etc.), user(s) associated with the object, etc. In some examples, such contextual data can be stored in the datastore 122, for example, in the channel data 128, the DM data 130, and/or the like. FIG. 5D illustrates an example of the object user interface element 516 being presented with contextual data 518 via the user interface 200. In some examples, the object user interface element 516 and the contextual data 518 can be presented via a new section 514 of the user interface 200. In some examples, the object 512 can be presented via a pop-up, overlay, new user interface, as part of an existing section of the user interface 200, etc.

Figure 5E:
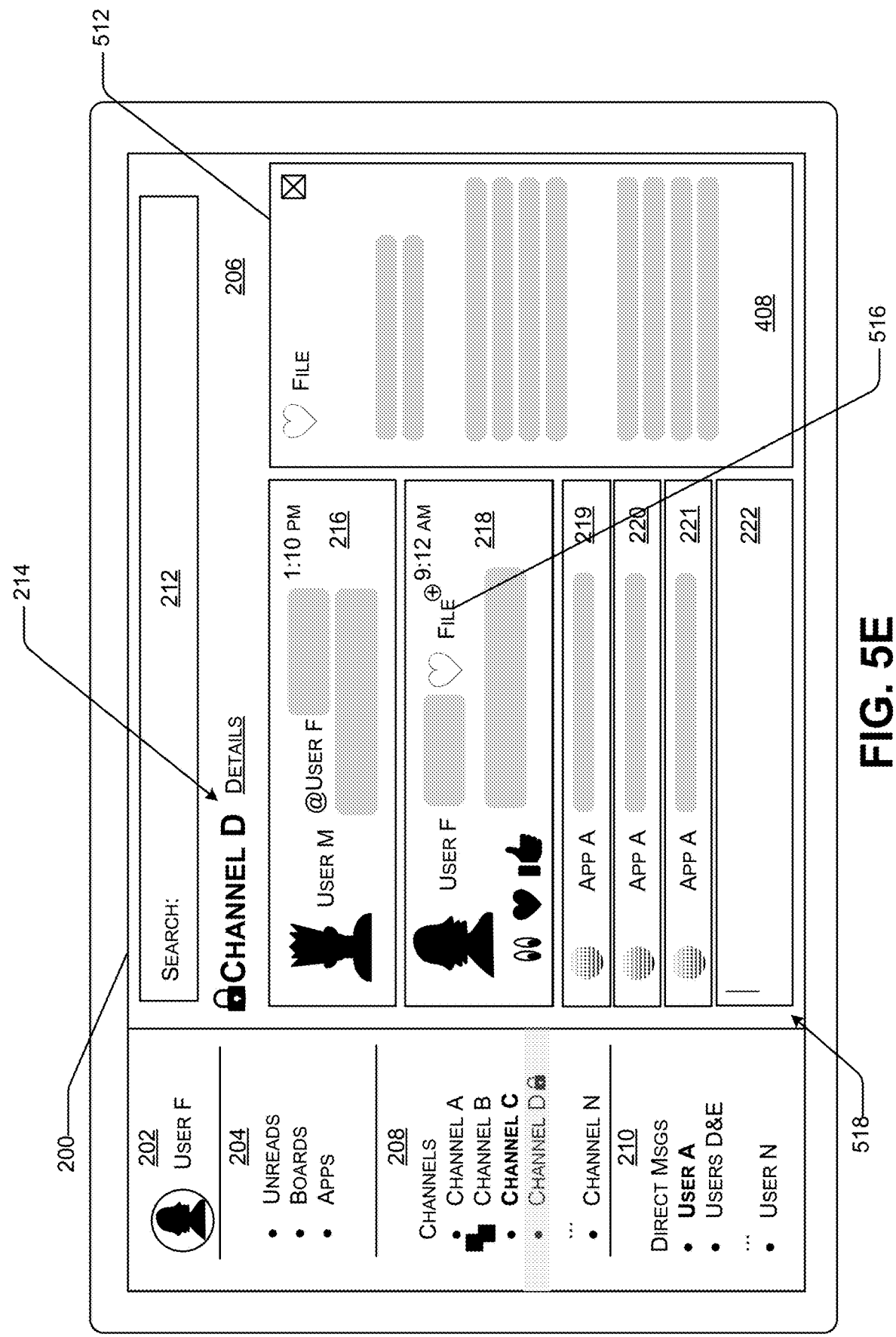
FIG. 5E illustrates another example of the user interface of FIG. 2A, as described herein, wherein an object accessible via an object user interface element of FIG. 5B is presented, with context, therein.

In some examples, based at least in part on receiving an indication of an interaction with an object user interface element, such as the object user interface element 510, the repository management component 116 can cause the object user interface element 516 and the contextual data 518, and the object 512 itself, to be presented via the user interface 200, as illustrated in FIG. 5E. In some examples, the object user interface element 516, the contextual data 518, and the object 512 can be presented via the second section 206 of the user interface 200, as illustrated in FIG. 5E. In some examples, the object user interface element 516, the contextual data 518, and the object 512 can be presented via a pop-up, overlay, new user interface, a new section of the user interface 200, or the like.

As described above, the user interface 200 can include a user interface element 504 that enables the user to share at least a portion of the repository with one or more other users. In at least one example, as illustrated in FIG. 5F, actuation of an actuation mechanism associated with the user interface element 504 can cause a sharing user interface 520 to be presented via the user interface 200. In some examples, the sharing user interface 520 can be presented as a pop-up, as illustrated in FIG. 5F. In some examples, the sharing user interface 520 can be presented as an overlay, a new user interface, a section of the user interface 200, and/or the like.

As described above, a repository can be associated with a user such that a user identifier is mapped to, or otherwise associated with, a repository identifier. In some examples, a repository can be associated with more than one user. In such an example, more than one user identifier or a group identifier can be associated with a repository identifier. In some examples, when a user desires to add another user (or group of users) to the repository (e.g., share the repository with one or more other users), the user can tag, mention, or otherwise identify the user via the sharing user interface 520 (e.g., via an input mechanism). In some examples, the user can share a link or other mechanism identifying the repository with the other user(s) to share the repository with the other user(s). In some examples, such a link or other mechanism can be provided via the sharing user interface 520. In some examples, when a repository is associated with multiple users, individual of the users can access object(s) and/or repository(s) associated with the repository subject to permissions associated therewith. In some examples, when a repository is associated with multiple users, each user can add object(s) to, remove object(s) from, or modify the repository subject to permissions associated therewith. If one of the users leaves or is removed from the sharing of the repository, the remaining users can continue to add object(s) to, remove object(s) from, or modify the repository.

Figure 5G:
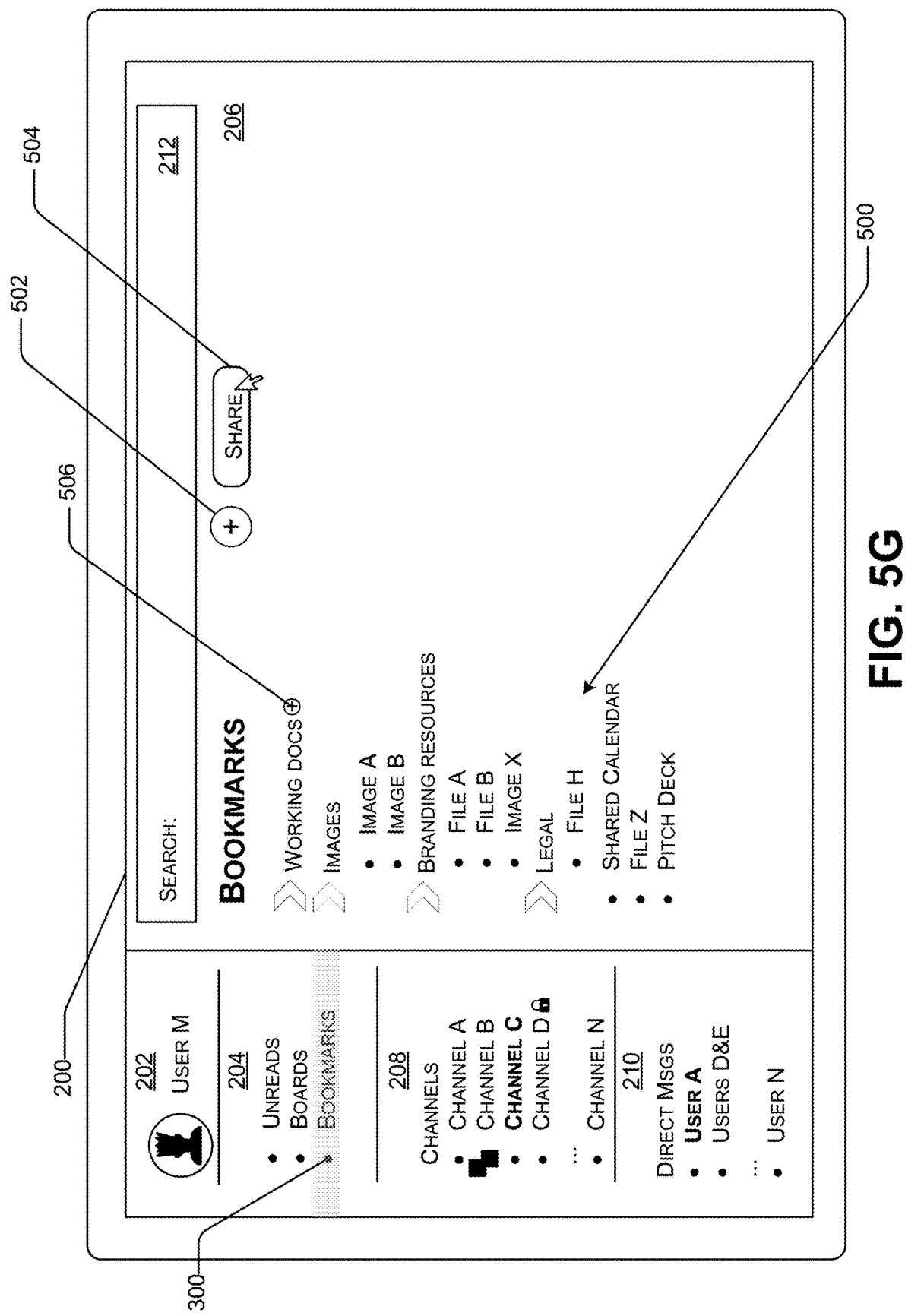
FIG. 5G illustrates another example of the user interface of FIG. 2A, as described herein, wherein the repository has been shared with another user.

In some examples, a user can opt to share all contents of the repository (e.g., all related repositories and/or objects associated therewith) with other user(s). In some examples, a user can opt to share a portion of the repository with other user(s). In such examples, the user can designate which repository(s) and/or object(s) they desire to share via interaction with the sharing user interface 520. That is, in some examples the user can select one or more objects or one or more repositories associated with the repository to share with one or more other users. In at least one example, a repository user interface element can be presented via an instance of the user interface presented via user computing device of each user with whom the repository is shared. For example, in FIG. 5G, the repository user interface element 300 representative of the repository is presented via the instance of the user interface 200 presented via the user computing device of User M. In at least one example, based at least in part on User M selecting, or otherwise interacting with the repository user interface element 300, the one or more other user interface elements 500 can be presented via the user interface 200 to enable the user (User M) to access the repositories and/or objects associated therewith.

In some examples, user(s) and/or object(s) can be associated with permission(s). In some examples, such permission(s) can determine whether users with whom a repository is shared has access to the repository and/or contents thereof. For example, if a repository is associated with a first group identifier and a second group identifier, and a user, associated with the first group identifier, shares the repository with another user associated with a third group identifier, the other user may not be permitted to view contents of the repository associated with the second group identifier. In another example, an object can be access-restricted to a group of users (e.g., which can be determined based at least in part on channel membership, group membership, object permission(s), etc.). As such, if the object is associated with a repository shared with a user that is not in the group of users, the user may not be permitted to access the object.

As described above, in some examples, user(s) and/or object(s) can be associated with permission(s) such that a user with whom a repository is shared does not have access to an object associated with the repository. In some examples, the repository management component 116 can refrain from causing an object user interface element representative of such an object to be presented via the user interface 200. In some examples, the repository management component 116 can cause such an object interface element to be presented but can deny the user access to the object (e.g., as the user does not have permission to access the object). That is, contents of the repository can present differently and/or have different access capabilities based on permission(s) associated with the user(s) with whom the repository has been shared and/or object(s) comprising contents of the repository.

Figure 6:
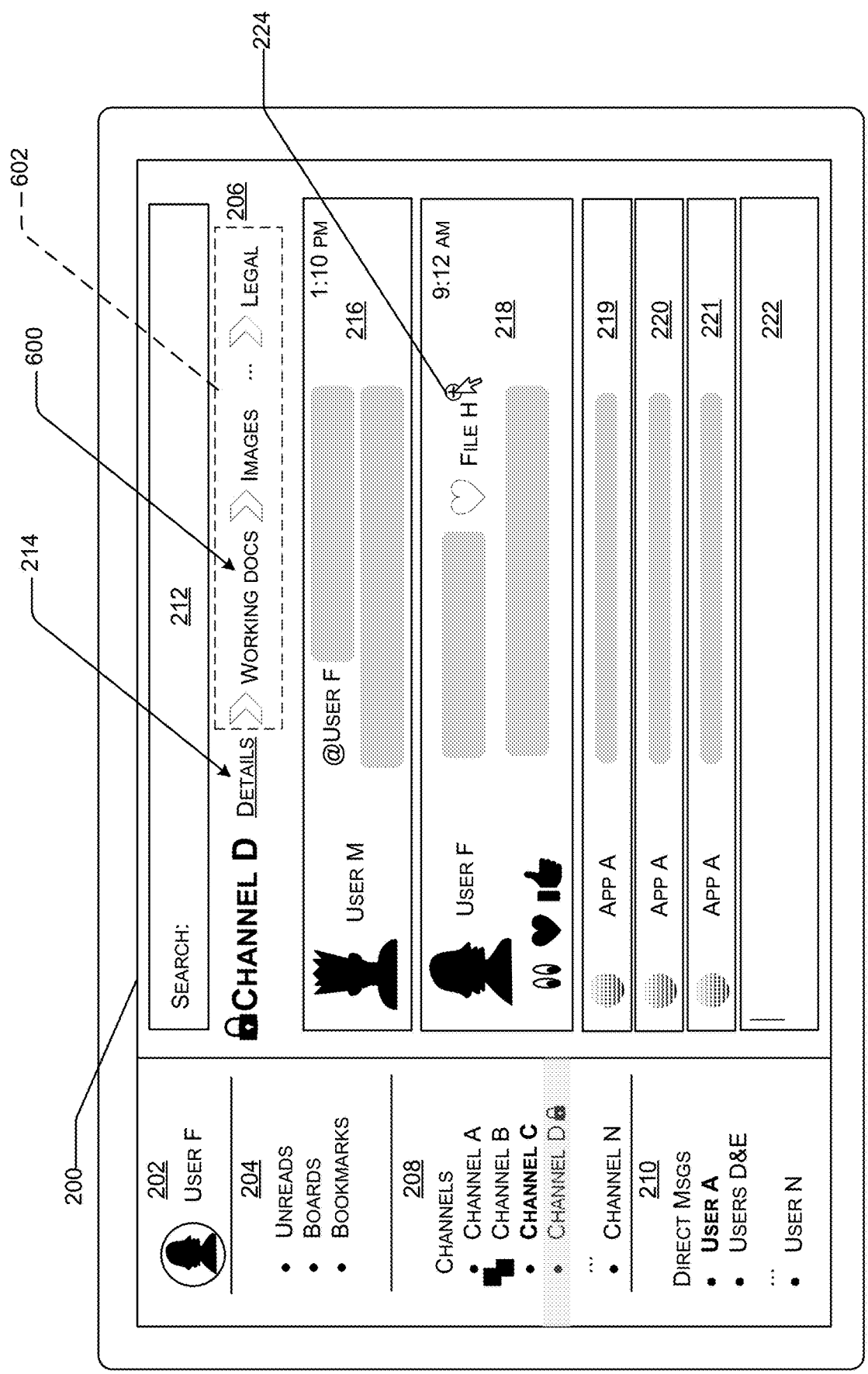
FIG. 6 illustrates another example of the user interface of FIG. 2A, as described herein, wherein the repository is set at a channel scope and the repository(s) and/or object(s) associated therewith are presented via a repository menu or bar associated with a channel.

FIG. 6 illustrates another example of the user interface of FIG. 2A, as described herein, wherein the repository is set at a channel scope and the repository(s) and/or object(s) associated therewith are presented via a repository menu or bar associated with a channel. That is, the repository described herein can be associated with different scopes, such as a user scope (i.e., a repository is sticky to the user, such that individual users have their own repositories), a channel scope (i.e., a repository is sticky to the channel, such that individual channels have their own repositories), a direct message scope (i.e., a repository is sticky to the direct message such that individual direct messages have their own repositories), a board scope (i.e., a repository is sticky to a board such that individual boards have their own repositories), and/or the like.

In at least one example, if the repository is set at a channel scope, the repository user interface elements can be associated with a channel or other virtual space, for example, in the header of the channel or other virtual space. That is, if the repository is set at a channel scope, one or more repository user interface elements 600 associated with one or more repositories can be presented in association with a channel, for example, in the header of the channel or other virtual space. In an example, the one or more repository user interface elements can comprise a repository menu or a repository bar 602. In some examples, interaction with an actuation mechanism associated with one of the one or more repository user interface elements 600 can cause associated repository(s) or object(s) represented by the repository user interface element to be presented via the user interface 200

In the example illustrated in FIG. 6, a user can pin messages, links (e.g., to files and/or applications), files, applications, etc.—which can be first-party or third-party objects—to the repository menu for subsequent access by the user or other users associated with the virtual space. Such messages, links, files, applications, etc. can be represented by repository user interface elements, as described above. In at least one example, an interaction with an actuation mechanism associated with one of the one or more repository user interface elements 600 can cause associated repository(s) or object(s) represented by the repository user interface element to be presented via the user interface 200. In some examples, interaction with the repository menu, or any portion thereof, can cause a preview of repository(s) and/or object(s) associated therewith to be presented via the user interface 200.

While FIG. 6 illustrates an example of a repository menu or a repository bar 602 associated with a channel, the same or similar configuration can be presented in association with another virtual space such as a user profile, direct message, board, and/or the like.

FIGS. 1-6 make reference to "user interface elements." A user interface element can be any element of the user interface that is representative of an object, message, virtual space, and/or the like. A user interface element can be a text element, a graphical element, a picture, a logo, a symbol, and/or the like. In at least one example, individual of the user interface elements can be associated with actuation mechanisms. Such actuation mechanisms can make the corresponding user interface elements interactable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The user interface 200 and variations described above are provided as a non-limiting example. Additional or alternative data can be presented via the user interface 200 and/or additional or alternative configurations of the data presented via the user interface 200 are within the scope of this disclosure.

FIGS. 7-10 are flowcharts showing example processes involving techniques as described herein. The processes illustrated in FIGS. 7-10 are described with reference to components described above with reference to the environment 100 shown in FIG. 1 and/or the user interface 200 described in FIGS. 2-6 for convenience and ease of understanding. However, the processes illustrated in FIGS. 7-10 are not limited to being performed using the components described above with reference to the environment 100 and/or the user interface 200. Moreover, the components described above with reference to the environment 100 and/or the user interface 200 are not limited to aspects described with respect to the processes illustrated in FIGS. 7-10.

The processes in FIGS. 7-10 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 7-10 can be combined in whole or in part with each other or with other processes.

Figure 7:
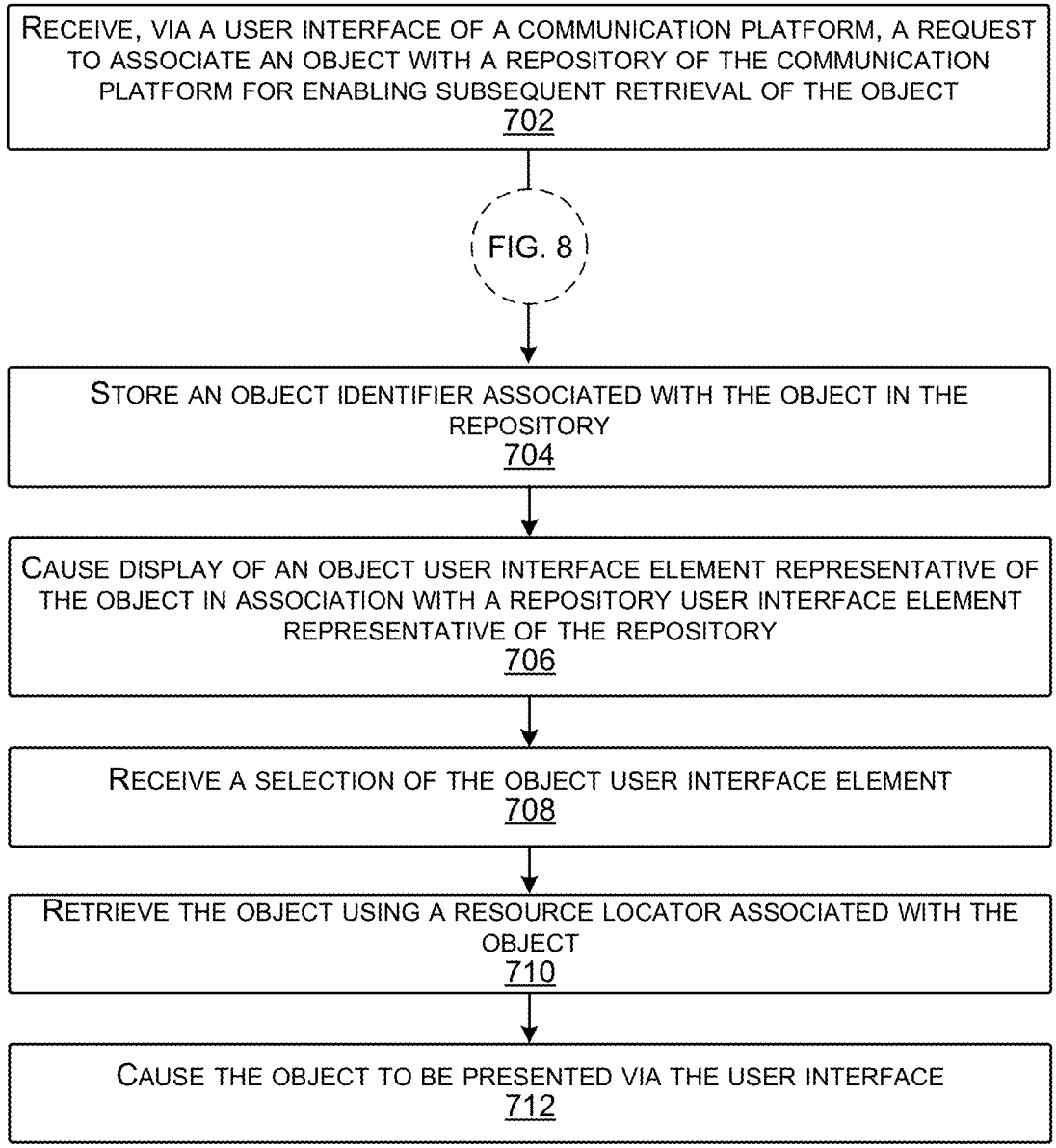
FIG. 7 illustrates an example process for associating an object with a repository and/or retrieving the object via the repository, as described herein.

FIG. 7 illustrates an example process 700 for associating an object with a repository and/or retrieving the object via the repository, as described herein.

At operation 702, the repository management component 116 can receive, via a user interface of a communication platform, a request to associate an object with a repository of the communication platform for enabling subsequent retrieval of the object. In at least one example, the repository management component 116 can receive a request to associate an object with a repository. As described above, an object can be text, an image, a video, a snippet of content, a user profile, a message, a thread, a file, a channel, a direct message, a board, a virtual space, an invitation, a sign-in request, an application, a workflow, and/or any other data item. In some examples, an object can be associated with a virtual space, which can comprise a channel, a direct message, a board, or the like. In some examples, an object can be a first-party object or a third-party object.

In some examples, the request can be received in response to an interaction with a user interface element proximate the object in a virtual space (e.g., as illustrated in FIG. 2A above). In some examples, such a user interface element can be interactable (e.g., associated with an actuation mechanism) such that when an interaction therewith is detected, a configuration user interface can be presented to enable the user to associate the object with the repository. In some examples, a request to associate an object with a repository can be received via a user interface element proximate a repository user interface element representative of the repository (e.g., as illustrated in FIG. 3A above). In some examples, such a user interface element can be interactable (e.g., associated with an actuation mechanism) such that when an interaction associated therewith is detected, a configuration user interface can be presented to enable the user to associate the object with the repository. Additional details associated with the configuration user interface are described above and also below with reference to FIG. 8.

In some examples, a request to associate an object with a repository can be received without using the configuration user interface. For instance, a user can drag and drop an object directly into a repository, for example, by dragging an object user interface element representative of the object to a repository user interface element representative of the repository and terminating the gesture proximate thereto. In such an example, the drag and drop gesture can represent a "request" to associate the object with the repository. In some examples, an object can be associated with a user interface element that is interactable to enable a user to add the object to the repository simply via interaction with the user interface element. As an example, an object can be associated with text, an icon, an image, or the like that (i) indicates that the object can be added to the repository and (ii) can facilitate the addition thereto in response to an actuation of an actuation mechanism associated therewith. In at least one example, actuation of the actuation mechanism can represent a "request" to associate the object with the repository. In some examples, a user may be prompted to confirm the addition of the object to the repository (e.g., via another interaction with the user interface). In some examples, an object can be associated with a repository in response to a spoken request (e.g., "associate that message with my bookmarks") or the like.

At operation 704, the repository management component 116 can store an object identifier associated with the object in the repository. That is, the repository management component 116 can associate the object with the repository. In at least one example, based at least in part on receiving a request to associate an object with the repository, the repository management component 116 can map, or otherwise associate, an object identifier and/or a resource locator associated with the object with a repository identifier of the repository.

In at least one example, the repository management component 116 can cause a repository user interface element representative of the repository to be presented via the user interface. In at least one example, the repository management component 116 can cause a repository user interface element, representative of the repository, to be presented via a user interface of the communication platform. In some examples, the repository user interface element can be interactable (e.g., associated with an actuation mechanism) to cause other repository user interface element(s) representative of repository(s) associated therewith and/or object user interface element(s) representative of object(s) associated therewith to be presented via the user interface.

In some examples, the repository user interface element can be presented based at least in part on associating the object with the repository. In other examples, the repository user interface element can be presented prior to the object being associated with the repository.

At operation 706, the repository management component 116 can cause display of an object user interface element representative of the object in association with a repository user interface element representative of the repository. In some examples, when an object is added to a repository, an object user interface element representative of the object can be presented via the user interface in association with the repository user interface element. As described above, the object user interface element can be associated with an object identifier and/or a resource locator associated with the object.

At operation 708, the repository management component 116 can receive a selection of the object user interface element. In at least one example, each object user interface element can be interactable (e.g., associated with an actuation mechanism) and, when an interaction therewith is detected, the repository management component 116 can receive an indication of such an interaction (e.g., via the application 140). In at least one example, the indication can be associated with an object identifier and/or resource locator of the object. In at least one example, the repository management component 116 can retrieve the object using a resource location associated with the object, as illustrated at operation 710. In some examples, if the indication includes the resource locator, the repository management component 116 can utilize the resource locator to retrieve the object. In some examples, if the indication does not include the resource locator, the repository management component 116 can use the object identifier to identify the resource locator (which can be associated with the object identifier) and retrieve the object using the resource locator. In some examples, the object can be retrieved from the datastore 122 and/or the third-party server(s) 121. In at least one example, if an object is a third-party object, the repository management component 116 can send a request for the third-party object to the third-party server(s) 121 via one or more API calls and/or connections. The third-party server(s) 121 can return the object in response to receiving the request.

At operation 712, the repository management component 116 can cause the object to be presented via the user interface. In at least one example, the repository management component 116 can cause the object to be presented in the user interface of the communication platform. That is, the repository management component 116 can cause the object to be presented in a section of the user interface or instead of the user interface (e.g., the object can be presented via a takeover). In some examples, the object can be presented "in context" such that one or more other objects that are associated with a same virtual space and/or timestamp(s) within a threshold period of time of the timestamp of when the object was posted to a virtual space can be presented with the object. That is, in some examples, based at least in part on selecting an object, a portion of the virtual space with which the object is associated and/or "contextual data" that is relevant to the object (e.g., based at least in part on date, time, topic, a relevance metric, etc.) can be presented with the object in the user interface. Examples of how the object and/or a reference to the object can be presented via the user interface 200 are described above with reference to FIGS. 5C-5E.

Figure 8:
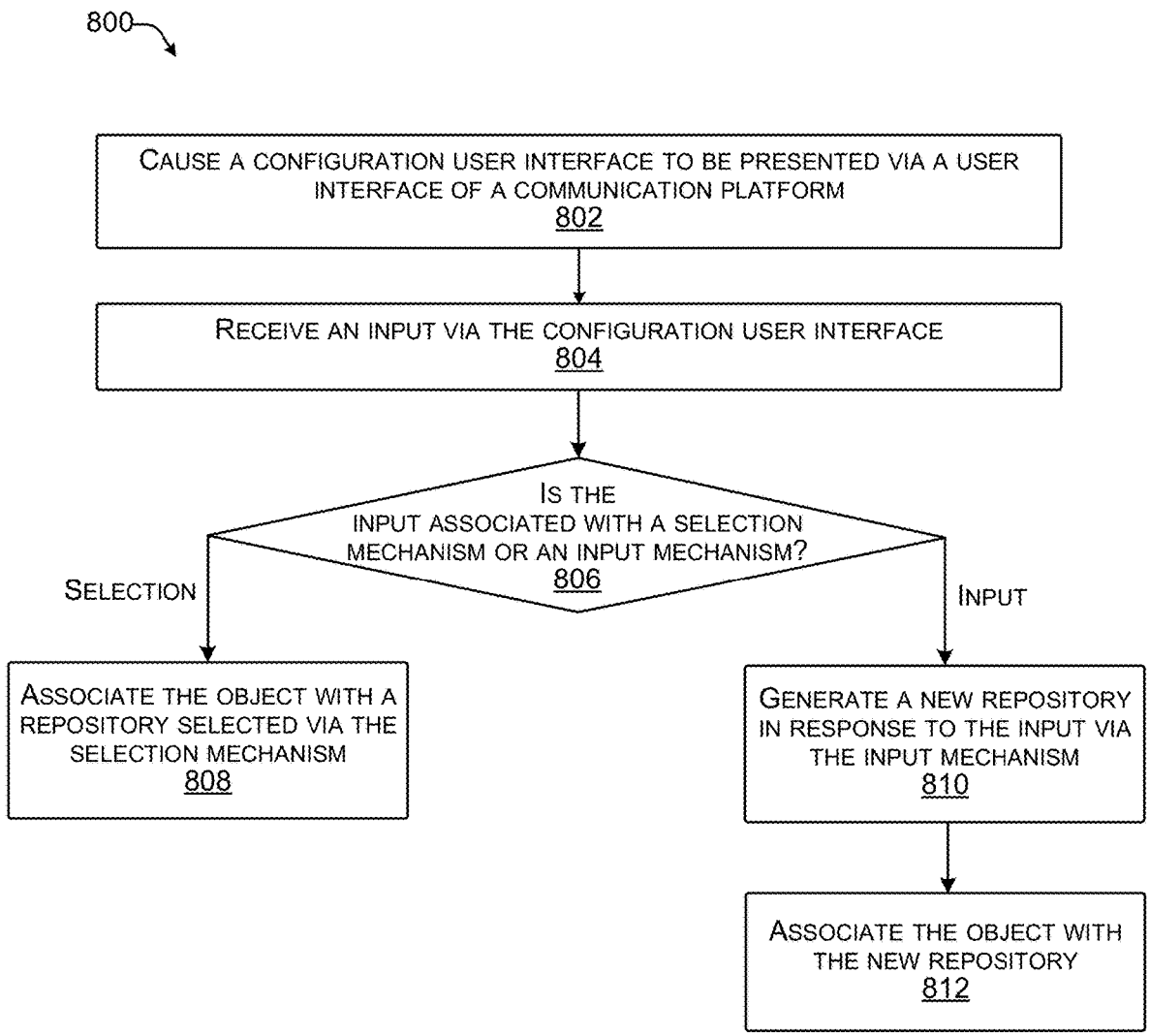
FIG. 8 illustrates another example process for associating an object with a repository, as described herein.

FIG. 8 illustrates an example process 800 for associating an object with a repository, as described herein.

At operation 802, the repository management component 116 can cause a configuration user interface to be presented via a user interface of a communication platform. In at least one example, the repository management component 116 can receive a request to associate an object with a repository. In some examples, the request can be received in response to an interaction with a user interface element proximate the object in a virtual space (e.g., as illustrated in FIG. 2A above). In some examples, such a user interface element can be interactable (e.g., associated with an actuation mechanism) such that when an interaction therewith is detected, a configuration user interface can be presented to enable the user to associate the object with the repository. In some examples, a request to associate an object with a repository can be received via a user interface element proximate a repository user interface element representative of the repository (e.g., as illustrated in FIG. 3A above). In some examples, such a user interface element can be interactable (e.g., associated with an actuation mechanism) such that when an interaction associated therewith is detected, a configuration user interface can be presented to enable the user to associate the object with the repository. Additional details associated with the configuration user interface are described above with reference to FIGS. 2A-3B.

At operation 804, the repository management component 116 can receive an input via the configuration user interface. As described above, in at least one example, the configuration user interface can include a selection mechanism and/or an input mechanism. In at least one example, the configuration user interface can be associated with a selection mechanism to enable users to select which pre-existing repository an object is to be associated. In some examples, the configuration user interface can present repository user interface elements representative of one or more existing repositories. In some examples, the repository user interface elements can be presented via a drop down or other mechanism for enabling a user to view the one or more repository user interface elements. In some examples, each of the repository user interface elements can be interactable (e.g., associated with an actuation mechanism) to enable a user to select the repository with which the object is to be associated (e.g., via interaction with an actuation mechanism associated therewith). In some examples, the configuration user interface can include an input mechanism to enable a user to provide a name for a new repository to be generated.

At operation 806, the repository management component 116 can determine whether the input is associated with a selection mechanism or an input mechanism. At operation 808, based at least in part on the input being associated with the selection mechanism, the repository management component 116 can associate the object with the repository selected via the selection mechanism. That is, an input associated with the selection mechanism can be associated with a repository identifier of a pre-existing repository. The repository management component 116 can associate the object identifier and/or resource locator of the object with the repository identifier of the pre-existing repository. That is, in at least one example, the repository management component 116 can store the object identifier and/or resource locator in the pre-existing repository.

At operation 810, based at least in part on the input being associated with the input mechanism, the repository management component 116 can generate a new repository in response to the input via the input mechanism and, at operation 812, the repository management component 116 can associate the object with the new repository. That is, the repository management component 116 can receive the input via the input mechanism, which can include a request to create a new repository and, in some examples, a name for the new repository. The repository management component 116 can create a new repository identifier and associate the object identifier and/or a resource locator of the object with the new repository identifier. That is, in at least one example, the repository management component 116 can store the object identifier and/or resource locator in the new repository.

In some examples, as described above, the configuration user interface can be triggered in response to an interaction with a user interface element proximate a repository user interface element. In such examples, the configuration user interface can be configured differently than when triggered from a user interface element proximate an object (e.g., because the object to be associated with the repository is unknown). For example, the configuration user interface can include an additional or alternative input mechanism for a user to add a resource locator associated with an object or otherwise identify an object to associate with the repository. In some examples, a user can upload an object for association with the repository via the configuration user interface. In some examples, a user can drag and drop an object into a repository (e.g., by dragging an object user interface element to a repository user interface element and/or the configuration user interface and terminating the dragging gesture proximate thereto) to associate the object with the repository. In some examples, a user can perform a search for an object (e.g., from within the configuration user interface) to select an object for association with a repository. In addition to identifying an object for association with the repository, in some examples, a user can select the repository from a plurality of other repositories or provide an input for a new repository to be generated via the configuration user interface.

Figure 9:
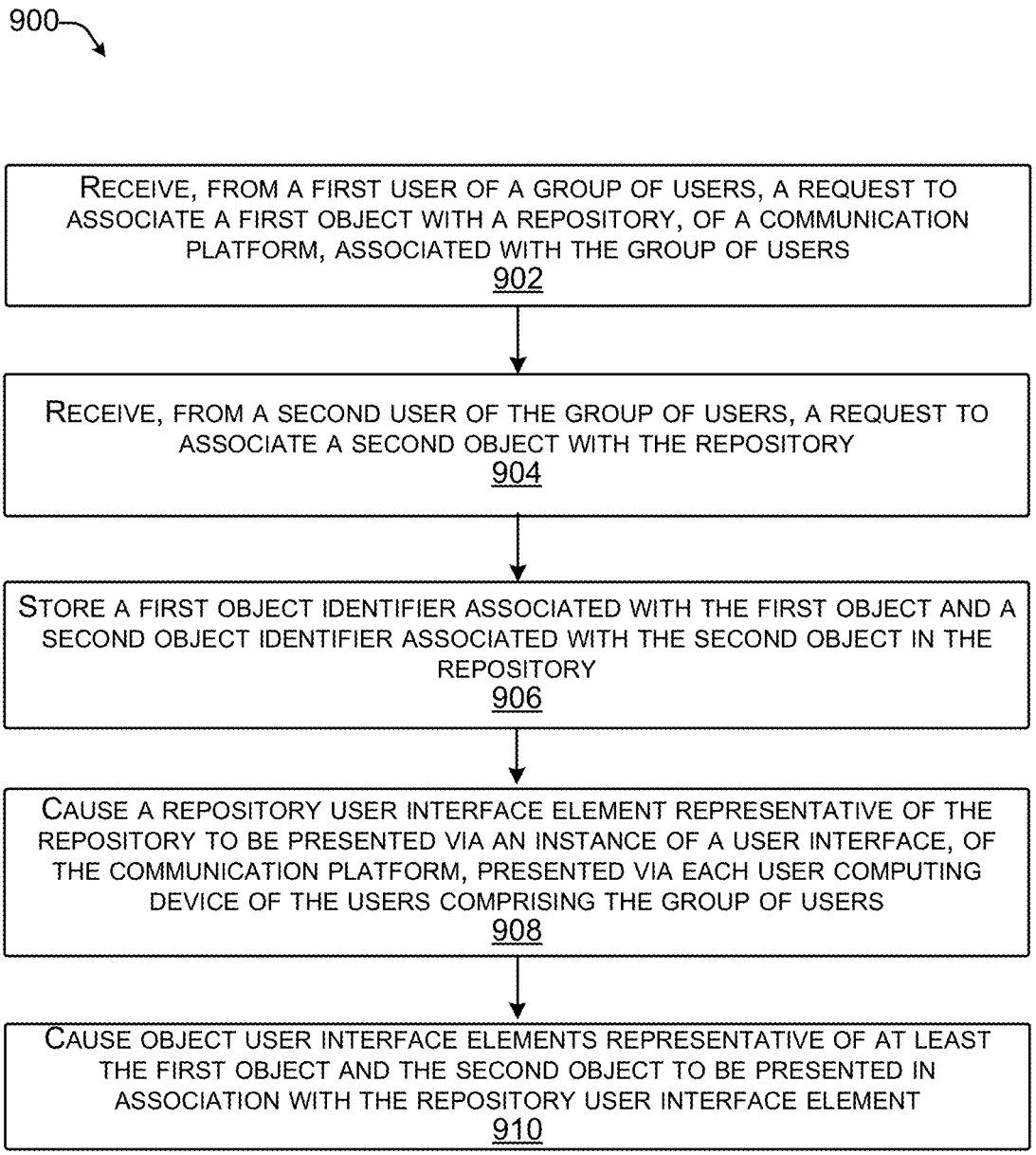
FIG. 9 illustrates an example process for associating objects with a repository associated with a group of users, as described herein.

FIG. 9 illustrates an example process 900 for associating objects with a repository associated with a group of users, as described herein.

At operation 902, the repository management component 116 can receive, from a first user of a group of users, a request to associate a first object with a repository, of a communication platform, associated with the group of users. In at least one example, a repository can be associated with two or more users, as described above. In some examples, such two or more users can comprise a "group of users." In some examples, the group of users can be associated with a same group identifier. In some examples, the group of users can be associated with different group identifiers. That is, in some examples, the repository can be a cross-workspace and/or shared repository. In at least one example, each user associated with the repository can add object(s) to the repository, remove object(s) from the repository, modify the repository (e.g., contents associated therewith), etc. In at last one example, a request to associate a first object with the repository can be received from a first user (e.g., user computing device thereof), which can be associated with the group of users. Additional details associated with receiving a request to associate an object with a repository are described above with reference to FIGS. 7 and 8.

At operation 904, the repository management component 116 can receive, from a second user of the group of users, a request to associate a second object with the repository. In at last one example, a request to associate a second object with the repository can be received from a second user (e.g., user computing device thereof) of the group of users. Additional details associated with receiving a request to associate an object with a repository are described above with reference to FIGS. 7 and 8.

At operation 906, the repository management component 116 can store a first object identifier associated with the first object and a second object identifier associated with the second object in the repository. In at least one example, the repository management component 116 can associate a first object identifier and/or resource locator associated with the first object with a second object identifier and/or resource locator associated with the second object with a repository identifier associated with the repository. In at least one example, the first user and/or the second user can arrange or organize the first object and the second object, for example with respect to other repositories associated with the repository and/or in a hierarchy.

At operation 908, the repository management component 116 can cause a repository user interface element to be presented via an instance of a user interface, of the communication platform, presented via each user computing device of the users comprising the group of users. As described above with reference to operation 606, the repository management component 116 can cause a repository user interface element, representative of the repository, to be presented via a user interface of the communication platform. In some examples, the repository user interface element can be interactable (e.g., associated with an actuation mechanism) to cause other repository user interface element(s) representative of repository(s) associated therewith and/or object user interface element(s) representative of object(s) associated therewith to be presented via the user interface. In an example where a repository is associated with a group of users, the repository user interface element can be presented via each instance of the user interface presented via each user computing device of the users of the group of users.

In some examples, the repository user interface element can be presented based at least in part on associating the object with the repository. In other examples, the repository user interface element can be presented prior to the object being associated with the repository, in which case, operation 908 can be omitted and the process 900 can proceed directly from operation 906 to 910.

At operation 910, the repository management component 116 can cause object user interface elements representative of at least the first object and the second object to be presented via the user interface in association with the repository user interface element. In some examples, when an object is added to a repository, an object user interface element representative of the object can be presented via the user interface in association with the repository user interface element. As described above, the object user interface element can be associated with an object identifier and/or a resource locator associated with the object. In at least one example, when two or more objects are associated with the repository, object user interface elements representative of each object can be presented via the user interface in association with the repository user interface element.

Figure 10:
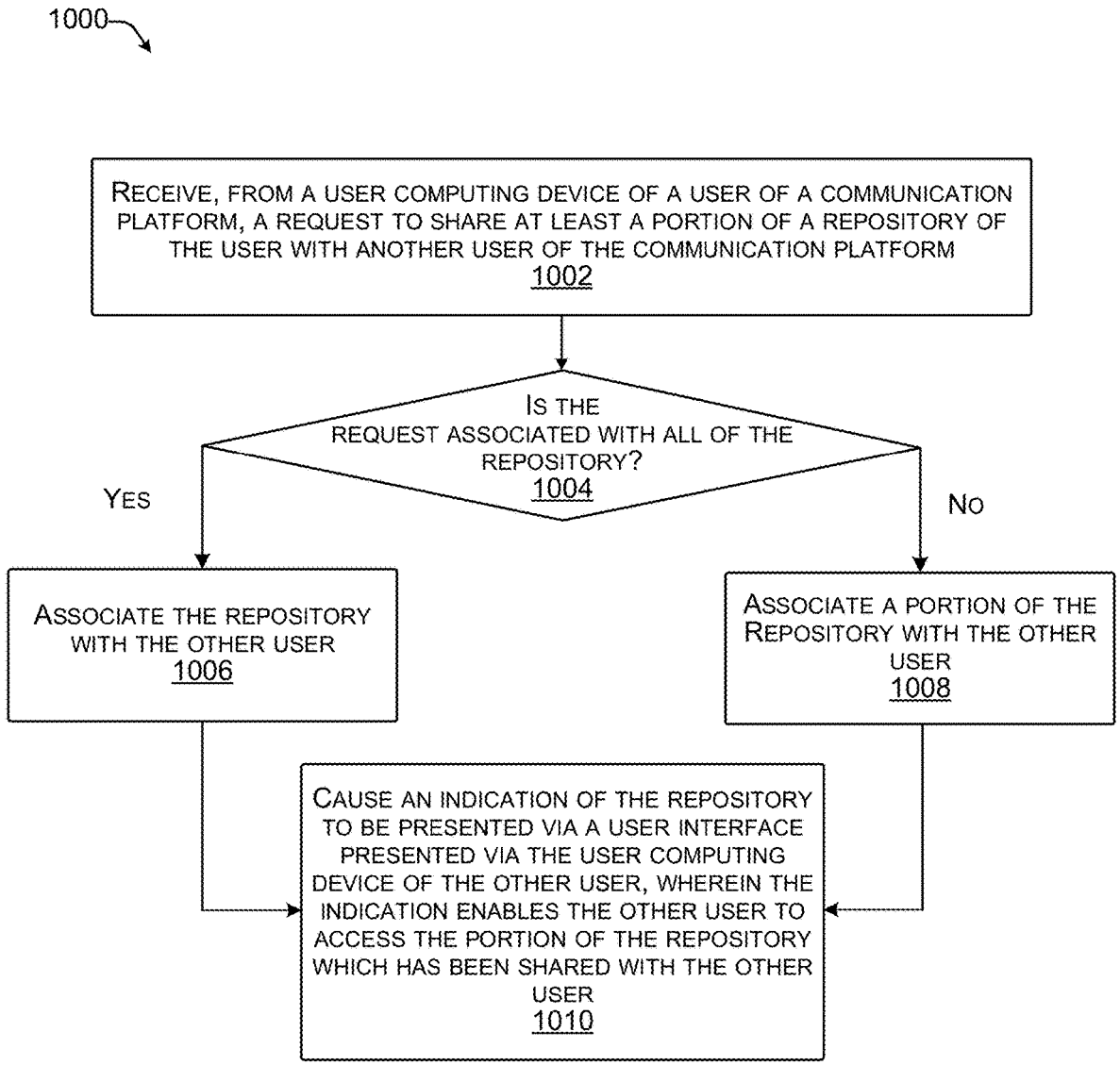
FIG. 10 illustrates an example process for sharing at least a portion of a repository with another user, as described herein.

FIG. 10 illustrates an example process 1000 for sharing at least a portion of a repository with another user, as described herein.

At operation 1002, the repository management component 116 can receive, from a user computing device of a user of a communication platform, a request to share at least a portion of a repository of the user with another user of the communication platform. As described above, in at least one example, a user interface associated with the communication platform can include a user interface element that enables the user to share at least a portion of the repository with one or more other users (e.g., as illustrated above with reference to FIG. 5F). In at least one example, actuation of an actuation mechanism associated with the user interface element can cause a sharing user interface to be presented via the user interface. In some examples, the sharing user interface can be presented as a pop-up, an overlay, a new user interface, a section of the user interface, and/or the like.

At operation 1004, the repository management component 116 can determine whether the request is associated with all of the repository or a portion of the repository. As described above, in some examples, a user can opt to share all contents of the repository (e.g., all related repositories and/or objects associated therewith) with other user(s). In some examples, a user can opt to share a portion of the repository with other user(s). In such examples, the user can designate which repository(s) and/or object(s) they desire to share via interaction with the sharing user interface. That is, in some examples the user can select one or more objects or one or more repositories associated with the repository to share with one or more other users.

In some examples, individual of the object(s) and/or repository(s) can be associated with user interface elements that enable a user to share that particular object and/or repository with another user. Actuation of an actuation mechanism associated with a user interface element associated with a repository and/or object can comprise a "request" to share at least a portion of the repository with another user. That is, in some examples, a repository and/or object can be shared without using the sharing user interface. In an example where a repository and/or object is shared directly with another user (e.g., without using the sharing user interface), the request can be associated with a portion of the repository.

At operation 1006, the repository management component 116 can associate the repository with the other user. In an example where all of the contents of the repository are shared with the other user (i.e., "yes" at operation 1004), the repository management component 116 can associate the repository identifier with a user identifier of the other user.

At operation 1008, the repository management component 116 can associate a portion of the repository with the other user. In an example where fewer than all of the contents of the repository are shared with the other user (i.e., "no" at operation 1004), the repository management component 116 can associate individual object identifier(s) and/or repository identifier(s) with a user identifier of the other user. In some examples, the repository management component 116 can refrain from associating the repository identifier with the user identifier of the other user. Or, in some examples, the repository management component 116 can associate the repository identifier with the user identifier of the other user, with an indicator indicating which object(s) and/or repository(s) are shared with the other user.

At operation 1010, the repository management component 116 can cause an indication of the repository to be presented via the user computing device of the other user, wherein the indication enables the other user to access the portion of the repository which has been shared with the other user. In at least one example, a repository user interface element can be presented via an instance of the user interface presented via user computing device of each user with whom the repository is shared. For example, the repository user interface element representative of the repository can be presented via an instance of the user interface 200 presented via the user computing device of the other user. In at least one example, based at least in part on the other user selecting, or otherwise interacting with the repository user interface element, the one or more other user interface elements can be presented via the user interface 200 to enable the other user to access the repositories and/or objects associated therewith.

As described above, in some examples, user(s) and/or object(s) can be associated with permission(s). In some examples, such permission(s) can determine whether users with whom a repository is shared has access to the repository and/or contents thereof. For example, if a repository is associated with a first group identifier and a second group identifier, and a user, associated with the first group identifier, shares the repository with another user associated with a third group identifier, the other user may not be permitted to view contents of the repository associated with the second group identifier. In another example, an object can be access-restricted to a group of users (e.g., which can be determined based at least in part on channel membership, group membership, object permission(s), etc.). As such, if the object is associated with a repository shared with a user that is not in the group of users, the user may not be permitted to access the object.

As described above, in some examples, user(s) and/or object(s) can be associated with permission(s) such that a user with whom a repository is shared does not have access to an object associated with the repository. In some examples, the repository management component 116 can refrain from causing an object user interface element representative of such an object to be presented via the user interface 200. In some examples, the repository management component 116 can cause such an object interface element to be presented but can deny the user access to the object (e.g., as the user does not have permission to access the object). That is, contents of the repository can present differently and/or have different access capabilities based on permission(s) associated with the user(s) with whom the repository has been shared and/or object(s) comprising contents of the repository.

Techniques described above with reference to FIGS. 1-10 enable users to have quick access to objects they deem important for subsequent recall via a repository. The repository described herein can provide a technical improvement to existing techniques. As described above, in some examples, a user interface of the communication platform can present a data feed indicating messages posted to and/or actions taken with respect to a particular channel, direct message, or the like. In existing techniques, the user interface can be cluttered and overwhelming to users. In existing techniques, the user interface can require users to scroll and/or otherwise navigate through data—from users, applications, and/or the like—to understand context of the communication and effectively utilize the communication platform. In existing techniques, if a user desires to access an object after the object is posted to the communication platform, the object can be difficult to locate for subsequently access and/or retrieval. In existing techniques, the user can be required to access multiple channels, messages, threads, etc. to locate and/or retrieve the object. This can be time consuming and resource consumptive (i.e., opening multiple channels, messages, threads, scrolling, etc.). As such, scrolling and/or other navigation can cause poor user experiences and can be inefficient.

The repository described herein enables users to "bookmark" objects such that they are accessible via the repository associated with the communication platform. As described above, such objects can be associated with one or more channels, direct messages, boards, threads, workspaces, organizations, and/or the like. The repository can be organized so that users can quickly access objects that are important without having to extensively scroll or otherwise navigate through data as described above. In view of the foregoing, the repository described herein can provide an improved user experience and improved user efficiency in interacting with user interfaces as described herein.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A method comprising: receiving, via an input to a user interface of a communication platform, a request to associate an object with a repository of the communication platform for enabling subsequent retrieval of the object; in response to receiving the request to associate the object with the repository, storing an object identifier associated with the object in the repository; causing display of an object user interface element representative of the object in association with a repository user interface element representative of the repository; in response to receiving a selection of the object user interface element, retrieving the object using the object identifier; and causing the object to be presented, in the user interface, with contextual data, wherein the contextual data comprises one or more other objects associated with the object.

B. The method of paragraph A, wherein the object comprises at least one of a message, an image, a file, an application, a workflow, a thread, or a user profile.

C. The method of paragraph A or B, wherein the object identifier is associated with a resource locator indicating a location of the object.

D. The method of any of paragraphs A-C, wherein the object is associated with a third-party platform, and wherein retrieving the object comprises retrieving the object from the third-party platform.

E. The method of any of paragraphs A-D, wherein the repository is associated with a user account of the communication platform.

F. The method of any of paragraphs A-E, wherein the repository is associated with a channel of the communication platform.

G. The method of any of paragraphs A-F, further comprising: in response to receiving the request to associate the object with the repository, causing a configuration user interface to be presented in the user interface; and receiving, via an input associated with the configuration user interface, an indication of the repository with which the object identifier is to be associated.

H. The method of paragraph G, wherein the configuration user interface includes a selection mechanism for receiving a selection of a repository from among a plurality of repositories accessible to a user account with which the request is associated, and wherein the indication of the repository comprises the selection of the repository via the selection mechanism.

I. The method of paragraph G or H, wherein the configuration user interface includes an input mechanism to at least one of create a new repository or name the new repository, and wherein the indication of the repository is received via the input mechanism.

J. A system comprising: one or more processors; and one or more non-transitory computer-readable media storing instructions that, when executed by the one or more processors, cause the system to perform operations comprising: receiving, via an input to a user interface of a communication platform, a request to associate an object with a repository of the communication platform for enabling subsequent retrieval of the object; in response to receiving the request to associate the object with the repository, storing an object identifier associated with the object in the repository; causing display of an object user interface element representative of the object in association with a repository user interface element representative of the repository; in response to receiving a selection of the object user interface element, retrieving the object using the object identifier; and causing the object to be presented, in the user interface, with contextual data, wherein the contextual data comprises one or more other objects associated with the object.

K. The system of paragraph J, wherein the object comprises at least one of a message, an image, a file, an application, a workflow, a thread, or a user profile.

L. The system of paragraph J or K, wherein the object is associated with a third-party platform, and wherein retrieving the object comprises retrieving the object from the third-party platform.

M. The system of any of paragraphs J-L, wherein the repository is associated with at least one of a user account of the communication platform, a group of user accounts of the communication platform, a channel of the communication platform, a direct message of the communication platform, or a board of the communication platform.

N. The system of any of paragraphs J-M, the operations further comprising: in response to receiving the request to associate the object with the repository, causing a configuration user interface to be presented in the user interface; and receiving, via an input associated with the configuration user interface, an indication of the repository with which the object identifier is to be associated.

O. The system of paragraph N, wherein the configuration user interface includes a selection mechanism for receiving a selection of a repository from among a plurality of repositories accessible to a user account with which the request is associated, and wherein the indication of the repository comprises the selection of the repository via the selection mechanism.

P. The system of paragraph N or O, wherein the configuration user interface includes an input mechanism to at least one of create a new repository or name the new repository, and wherein the indication of the repository is received via the input mechanism.

Q. One or more non-transitory computer-readable media storing instructions that, when executed by one or more processors, cause the one or more processors to perform operations comprising: receiving, via an input to a user interface of a communication platform, a request to associate an object with a repository of the communication platform for enabling subsequent retrieval of the object; in response to receiving the request to associate the object with the repository, storing an object identifier associated with the object in the repository; causing display of an object user interface element representative of the object in association with a repository user interface element representative of the repository; in response to receiving a selection of the object user interface element, retrieving the object using the object identifier; and causing the object to be presented, in the user interface, with contextual data, wherein the contextual data comprises one or more other objects associated with the object.

R. The one or more non-transitory computer-readable media of paragraph Q, wherein the repository is associated with at least one of a user account of the communication platform, a group of user accounts of the communication platform, a channel of the communication platform, a direct message of the communication platform, or a board of the communication platform.

S. The one or more non-transitory computer-readable media of paragraph Q or R, the operations further comprising: in response to receiving the request to associate the object with the repository, causing a configuration user interface to be presented in the user interface; and receiving, via an input associated with the configuration user interface, an indication of the repository with which the object identifier is to be associated.

T. The one or more non-transitory computer-readable media of paragraph S, wherein the configuration user interface includes at least one of: a selection mechanism for receiving a selection of a repository from among a plurality of repositories accessible to a user account with which the request is associated, and wherein the indication of the repository comprises the selection of the repository via the selection mechanism; or an input mechanism to at least one of create a new repository or name the new repository, and wherein the indication of the repository is received via the input mechanism.

While the paragraphs above are described with respect to one particular implementation, it should be understood that, in the context of this document, the content of the paragraphs above can also be implemented via a method, device, system, a computer-readable medium, and/or another implementation. Additionally, any of paragraphs A-T may be implemented alone or in combination with any other one or more of the paragraphs A-T.

What is claimed is:

1. A method comprising:
    receiving, from a user and via a search mechanism of a user interface of a group-based communication platform, first user input associated with a search of an object to be associated with a repository of the group-based communication platform for enabling subsequent retrieval of the object, wherein an extent of the search is restricted to a group of the group-based communication platform to which the user belongs;
    receiving, from the user, second user input comprising a request to associate the object with the repository, the repository being set at a repository scope of a plurality of different available repository scopes, wherein the plurality of different available repository scopes comprises a user account of the communication platform, a group of user accounts of the communication platform, a channel of the communication platform, a direct message of the communication platform, and a board of the communication platform;
    storing, in response to receiving the first user input and the second user input, an object identifier associated with the object and the repository;
    determining to display an object user interface element representative of the object, and determining the repository scope of the object;
    in response to determining the repository scope of the object, determine matching repositories corresponding to the repository scope, and displaying a repository menu representative of the repository including the matching repositories, wherein the repository menu comprises an actuation mechanism configured to cause presentation of the repository via the user interface of the group-based communication platform;
    in response to receiving a selection of the object user interface element, retrieving the object using the object identifier; and
    causing the object to be presented, in the user interface, with contextual data, wherein the contextual data comprises one or more other objects associated with respective timestamps within a threshold time period of a timestamp associated with the object.

2. The method of claim 1, wherein the object comprises at least one of a message, an image, a file, an application, a workflow, a thread, or a user profile.

3. The method of claim 1, wherein the object identifier is associated with a resource locator indicating a location of the object.

4. The method of claim 1, wherein the object is associated with a third-party platform, and wherein retrieving the object comprises retrieving the object from the third-party platform.

5. The method of claim 1, further comprising: in response to receiving the second user input comprising the request to associate the object with the repository, causing a configuration user interface to be presented in the user interface; and
    receiving, via third user input associated with the configuration user interface, an indication of the repository with which the object identifier is to be associated.

6. The method of claim 5, wherein the configuration user interface includes a selection mechanism for receiving a selection of a repository from among a plurality of repositories accessible to a user account with which the request is associated, and wherein the indication of the repository comprises the selection of the repository via the selection mechanism.

7. The method of claim 5, wherein the configuration user interface includes an input mechanism to at least one of create a new repository or name the new repository, and wherein the indication of the repository is received via the input mechanism.

8. A system comprising:
    one or more processors; and
    one or more non-transitory computer-readable media storing instructions that, when executed by the one or more processors, cause the system to perform operations comprising:
        receiving from a user and via a search mechanism of a user interface of a communication platform, first user input associated with a search of an object to be associated with a repository of the communication platform for enabling subsequent retrieval of the object, wherein an extent of the search is restricted to a group of the group-based communication platform to which the user belongs;
        receiving, from the user, second user input comprising a request to associate the object with the repository, the repository being set at a repository scope of a plurality of different available repository scopes, wherein the plurality of different available repository scopes comprises a user account of the communication platform, a group of user accounts of the communication platform, a channel of the communication platform, a direct message of the communication platform, and a board of the communication platform;
        storing, in response to receiving the first user input and the second user input, an object identifier associated with the object and the repository;
        determining to display an object user interface element representative of the object, and determining the repository scope of the object;
        in response to determining the repository scope of the object, determine matching repositories corresponding to the repository scope, and displaying a repository menu representative of the repository including the matching repositories, wherein the repository menu comprises an actuation mechanism configured to cause presentation of the repository via the user interface of the communication platform;
        in response to receiving a selection of the object user interface element, retrieving the object using the object identifier; and
        causing the object to be presented, in the user interface, with contextual data, wherein the contextual data comprises one or more other objects associated with respective timestamps within a threshold time period of a timestamp associated with the object.

9. The system of claim 8, wherein the object comprises at least one of a message, an image, a file, an application, a workflow, a thread, or a user profile.

10. The system of claim 8, wherein the object is associated with a third-party platform, and wherein retrieving the object comprises retrieving the object from the third-party platform.

11. The system of claim 8, the operations further comprising: in response to receiving the second user input comprising the request to associate the object with the repository, causing a configuration user interface to be presented in the user interface; and receiving, via third user input associated with the configuration user interface, an indication of the repository with which the object identifier is to be associated.

12. The system of claim 11, wherein the configuration user interface includes a selection mechanism for receiving a selection of a repository from among a plurality of repositories accessible to a user account with which the request is associated, and wherein the indication of the repository comprises the selection of the repository via the selection mechanism.

13. The system of claim 11, wherein the configuration user interface includes an input mechanism to at least one of create a new repository or name the new repository, and wherein the indication of the repository is received via the input mechanism.

14. One or more non-transitory computer-readable media storing instructions that, when executed by one or more processors, cause the one or more processors to perform operations comprising:

receiving, from a user and via a search mechanism of a user interface of a communication platform, first user input associated with a search of an object to be associated with a repository of the communication platform for enabling subsequent retrieval of the object, wherein an extent of the search is restricted to a group of the group-based communication platform to which the user belongs;

receiving, from the user, second user input comprising a request to associate the object to with the repository, the repository being set at a repository scope of a plurality of different available repository scopes, wherein the plurality of different available repository scopes comprises a user account of the communication platform, a group of user accounts of the communication platform, a channel of the communication platform, a direct message of the communication platform, and a board of the communication platform;

storing, in response to receiving the first user input and the second user input, an object identifier associated with the object and the repository;

determining to display of an object user interface element representative of the object, and determining the repository scope of the object;

in response to determining the repository scope of the object, determine matching repositories corresponding to the repository scope, and displaying a repository menu representative of the repository including the matching repositories, wherein the repository menu comprises an actuation mechanism configured to cause presentation of the repository via the user interface of the communication platform;

in response to receiving a selection of the object user interface element, retrieving the object using the object identifier; and causing the object to be presented, in the user interface, with contextual data, wherein the contextual data comprises one or more other objects associated with respective timestamps within a threshold time period of a timestamp associated with the object.

15. The one or more non-transitory computer-readable media of claim 14, the operations further comprising:

in response to receiving the second user input comprising the request to associate the object with the repository, causing a configuration user interface to be presented in the user interface; and receiving, via a-third user input associated with the configuration user interface, an indication of the repository with which the object identifier is to be associated.

16. The one or more non-transitory computer-readable media of claim 15, wherein the configuration user interface includes at least one of:

a selection mechanism for receiving a selection of a repository from among a plurality of repositories accessible to a user account with which the request is associated, and wherein the indication of the repository comprises the selection of the repository via the selection mechanism; or an input mechanism to at least one of create a new repository or name the new repository, and wherein the indication of the repository is received via the input mechanism.

* * * * *